United States Patent
Peters

(10) Patent No.: US 12,270,258 B2
(45) Date of Patent: Apr. 8, 2025

(54) VISCOUS VIBRATION DAMPING OF TORSIONAL OSCILLATION

(71) Applicant: Volker Peters, Wienhausen (DE)

(72) Inventor: Volker Peters, Wienhausen (DE)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 130 days.

(21) Appl. No.: 17/018,307

(22) Filed: Sep. 11, 2020

(65) Prior Publication Data
US 2021/0079976 A1 Mar. 18, 2021

Related U.S. Application Data

(60) Provisional application No. 62/899,331, filed on Sep. 12, 2019, provisional application No. 62/899,354,
(Continued)

(51) Int. Cl.
*E21B 17/07* (2006.01)
*E21B 17/042* (2006.01)
(Continued)

(52) U.S. Cl.
CPC ........ *E21B 17/076* (2013.01); *E21B 17/0423* (2013.01); *E21B 17/10* (2013.01);
(Continued)

(58) Field of Classification Search
CPC .... F16F 15/173; F16F 15/167; F16F 2222/02; F16F 2232/02; F16F 9/52; E21B 17/006
See application file for complete search history.

(56) References Cited

U.S. PATENT DOCUMENTS

| | | | | |
|---|---|---|---|---|
| 2,585,382 A | * | 2/1952 | Guernsey | F16F 15/1492 74/573.12 |
| 2,834,225 A | * | 5/1958 | Carter | F16F 15/173 74/573.13 |

(Continued)

FOREIGN PATENT DOCUMENTS

| | | |
|---|---|---|
| CN | 202001549 U | 10/2011 |
| CN | 102401086 A | 4/2012 |

(Continued)

OTHER PUBLICATIONS

Aiken ID, Nims DK, Whittaker AS, Kelly JM. "Testing of Passive Energy Dissipation Systems". Earthquake Spectra. 1993;9(3):335-370.

(Continued)

*Primary Examiner* — Daniel D Yabut
(74) *Attorney, Agent, or Firm* — CANTOR COLBURN LLP

(57) ABSTRACT

An apparatus for damping vibrations includes an inertial mass disposed in a cavity in a rotatable downhole component, the rotatable component configured to be disposed in a borehole in a subsurface formation, such as a resource bearing formation, the inertial mass coupled to a surface of the cavity by a damping fluid and configured to move within the cavity relative to the downhole component. The apparatus also includes a damping fluid disposed in the cavity between the inertial mass and an inner surface of the cavity, where rotational acceleration of the rotatable downhole component causes shear in the damping fluid to dissipate energy from rotational acceleration of the rotatable downhole component and causing the rotational acceleration to be reduced.

23 Claims, 9 Drawing Sheets

Related U.S. Application Data filed on Sep. 12, 2019, provisional application No. 62/899,332, filed on Sep. 12, 2019, provisional application No. 62/899,291, filed on Sep. 12, 2019.

(51) Int. Cl.
*E21B 17/10* (2006.01)
*F16F 9/52* (2006.01)
*F16F 15/121* (2006.01)
*F16F 15/129* (2006.01)
*F16F 15/173* (2006.01)
*E21B 17/00* (2006.01)
*F16F 15/16* (2006.01)
*F16F 15/18* (2006.01)

(52) U.S. Cl.
CPC ............ *F16F 9/52* (2013.01); *F16F 15/1216* (2013.01); *F16F 15/129* (2013.01); *F16F 15/173* (2013.01); *E21B 17/006* (2013.01); *F16F 15/16* (2013.01); *F16F 15/18* (2013.01); *F16F 2222/02* (2013.01); *F16F 2232/02* (2013.01); *F16F 2236/08* (2013.01); *F16F 2238/024* (2013.01)

(56) References Cited

U.S. PATENT DOCUMENTS

| | | | |
|---|---|---|---|
| 2,903,242 A | 9/1959 | Bodine, Jr. | |
| 2,953,351 A | 9/1960 | Bodine et al. | |
| 2,987,938 A * | 6/1961 | Burch | F16F 15/173 |
| | | | 220/4.24 |
| 3,099,918 A | 8/1963 | Garrett | |
| 3,121,347 A * | 2/1964 | Rumsey | F16F 15/173 |
| | | | 74/573.1 |
| 3,323,326 A | 6/1967 | Vertson | |
| 3,552,230 A * | 1/1971 | McLean | F16F 15/173 |
| | | | 74/573.12 |
| 3,768,576 A | 10/1973 | Martini | |
| 3,848,931 A | 11/1974 | Swisher | |
| 3,992,963 A * | 11/1976 | Khanna | F16F 15/173 |
| | | | 74/573.12 |
| 4,271,915 A | 6/1981 | Bodine | |
| 4,428,443 A | 1/1984 | Oliphant | |
| 4,502,552 A | 3/1985 | Martini | |
| 4,522,271 A | 6/1985 | Bodine et al. | |
| 4,593,889 A | 6/1986 | Odobasic | |
| 4,619,334 A | 10/1986 | Gustafsson | |
| 4,905,776 A * | 3/1990 | Beynet | F16F 15/363 |
| | | | 175/320 |
| 5,372,548 A | 12/1994 | Wohlfeld | |
| 5,402,677 A | 4/1995 | Paslay et al. | |
| 5,743,362 A * | 4/1998 | Clinard | F16F 9/3415 |
| | | | 188/276 |
| 5,845,542 A | 12/1998 | Hannah et al. | |
| 6,098,726 A | 8/2000 | Taylor et al. | |
| 6,119,404 A | 9/2000 | Bschorr et al. | |
| 6,158,529 A | 12/2000 | Dorel | |
| 6,327,539 B1 | 12/2001 | Keultjes et al. | |
| 6,758,921 B1 | 7/2004 | Streubel et al. | |
| 6,785,641 B1 | 8/2004 | Huang | |
| 6,808,455 B1 | 10/2004 | Solorenko et al. | |
| 7,036,612 B1 | 5/2006 | Raymond et al. | |
| 7,219,752 B2 | 5/2007 | Wassell et al. | |
| 7,251,590 B2 | 7/2007 | Huang et al. | |
| 7,748,474 B2 | 7/2010 | Watkins et al. | |
| 7,779,933 B2 | 8/2010 | Sihler et al. | |
| 7,828,082 B2 | 11/2010 | Pabon et al. | |
| 8,214,188 B2 | 7/2012 | Bailey et al. | |
| 8,401,831 B2 | 3/2013 | Tang et al. | |
| 8,453,764 B2 | 6/2013 | Turner et al. | |
| 8,504,342 B2 | 8/2013 | Bailey et al. | |
| 8,589,136 B2 | 11/2013 | Ertas et al. | |
| 8,798,978 B2 | 8/2014 | Ertas et al. | |
| 8,950,512 B2 | 2/2015 | Nessjoen et al. | |
| 8,977,523 B2 | 3/2015 | Ertas et al. | |
| 9,004,195 B2 | 4/2015 | Regener et al. | |
| 9,109,410 B2 | 8/2015 | Swietlik et al. | |
| 9,249,632 B2 | 2/2016 | Lakkashetti et al. | |
| 9,382,761 B2 | 7/2016 | Huang et al. | |
| 9,458,679 B2 | 10/2016 | Turner et al. | |
| 9,476,261 B2 | 10/2016 | Venugopal et al. | |
| 9,581,008 B2 | 2/2017 | Kyllingstad | |
| 9,677,347 B2 | 6/2017 | Ash et al. | |
| 9,835,226 B2 | 12/2017 | Son | |
| 9,976,405 B2 | 5/2018 | Hohl et al. | |
| 10,782,197 B2 | 9/2020 | Wu et al. | |
| 11,692,404 B2 | 7/2023 | Peters et al. | |
| 2003/0062170 A1 | 4/2003 | Slack | |
| 2004/0028490 A1 | 2/2004 | Bergholt et al. | |
| 2004/0238219 A1 | 12/2004 | Nichols et al. | |
| 2005/0145417 A1 | 7/2005 | Radford et al. | |
| 2005/0235943 A1 | 10/2005 | Watanabe et al. | |
| 2005/0257913 A1 | 11/2005 | Mody et al. | |
| 2006/0124354 A1 | 6/2006 | Witte | |
| 2006/0278442 A1 | 12/2006 | Kristensen | |
| 2007/0289778 A1 | 12/2007 | Watkins | |
| 2008/0060849 A1 | 3/2008 | Entchev et al. | |
| 2009/0044977 A1 | 2/2009 | Johnson et al. | |
| 2010/0025118 A1 | 2/2010 | Hampson et al. | |
| 2010/0139977 A1 | 6/2010 | Watkins et al. | |
| 2011/0077924 A1 | 5/2011 | Ertas et al. | |
| 2011/0120772 A1 | 5/2011 | McLoughlin et al. | |
| 2011/0186353 A1 | 8/2011 | Turner et al. | |
| 2011/0198126 A1 | 8/2011 | Swietlik et al. | |
| 2011/0245980 A1 | 10/2011 | Nessjoen et al. | |
| 2012/0123757 A1 | 5/2012 | Ertas et al. | |
| 2012/0130693 A1 | 5/2012 | Ertas et al. | |
| 2012/0228028 A1 | 9/2012 | Turner et al. | |
| 2012/0241219 A1 | 9/2012 | Wiercigroch | |
| 2013/0092439 A1 | 4/2013 | Mauldin et al. | |
| 2014/0083772 A1 | 3/2014 | Wiercigroch | |
| 2014/0151122 A1 | 6/2014 | Venugopal et al. | |
| 2014/0166309 A1 | 6/2014 | Benedict et al. | |
| 2014/0284105 A1 | 9/2014 | Veltman | |
| 2014/0305660 A1 | 10/2014 | Ash et al. | |
| 2014/0318865 A1 | 10/2014 | Doris | |
| 2014/0323231 A1 | 10/2014 | Perry | |
| 2015/0050083 A1 | 2/2015 | Funderud et al. | |
| 2015/0053484 A1 | 2/2015 | Meister et al. | |
| 2015/0083493 A1 | 3/2015 | Wassell | |
| 2015/0122547 A1 | 5/2015 | Hohl et al. | |
| 2015/0259989 A1 | 9/2015 | Gajji et al. | |
| 2015/0275648 A1 | 10/2015 | Wang et al. | |
| 2016/0002985 A1 | 1/2016 | Baudoin | |
| 2016/0138382 A1 | 5/2016 | Badkoubeh et al. | |
| 2016/0281488 A1 | 9/2016 | Dwars et al. | |
| 2016/0305197 A1 | 10/2016 | Gajji et al. | |
| 2016/0356089 A1 | 12/2016 | Nanayakkara et al. | |
| 2017/0030149 A1 | 2/2017 | Kadam et al. | |
| 2017/0089149 A1 | 3/2017 | Yao et al. | |
| 2017/0198840 A1 | 7/2017 | Gabdullin | |
| 2017/0328142 A1 | 11/2017 | Pratt et al. | |
| 2017/0343046 A1 | 11/2017 | Park et al. | |
| 2018/0066488 A1 | 3/2018 | Wiercigroch et al. | |
| 2018/0100357 A1 | 4/2018 | Christopher et al. | |
| 2018/0252054 A1 | 9/2018 | Stokes | |
| 2018/0252089 A1 | 9/2018 | Hohl et al. | |
| 2018/0371889 A1 | 12/2018 | Hohl et al. | |
| 2019/0211882 A1 * | 7/2019 | Hauptmann | F16D 3/80 |
| 2019/0284881 A1 | 9/2019 | Hohl et al. | |
| 2019/0284882 A1 | 9/2019 | Peters et al. | |
| 2019/0360320 A1 | 11/2019 | Hohl | |
| 2020/0018124 A1 | 1/2020 | Hohl | |
| 2020/0018377 A1 | 1/2020 | Hohl et al. | |
| 2021/0010332 A1 | 1/2021 | Benedict et al. | |
| 2021/0079736 A1 | 3/2021 | Reckmann et al. | |
| 2021/0079737 A1 | 3/2021 | Peters | |
| 2021/0079738 A1 | 3/2021 | Peters et al. | |
| 2021/0207469 A1 | 7/2021 | Nash et al. | |
| 2021/0270120 A1 | 9/2021 | Hohl et al. | |

(56) References Cited

U.S. PATENT DOCUMENTS

| | | |
|---|---|---|
| 2023/0009235 A1 | 1/2023 | Kulke et al. |
| 2023/0160267 A1 | 5/2023 | Falahati et al. |
| 2023/0193740 A1 | 6/2023 | Hohl |

FOREIGN PATENT DOCUMENTS

| | | | | |
|---|---|---|---|---|
| CN | 103147696 A | 6/2013 | | |
| CN | 103939092 A | 7/2014 | | |
| CN | 104565198 A | 4/2015 | | |
| DE | 2531817 A1 | 2/1977 | | |
| DE | 102006001063 A1 * | 1/2007 | ............ | F16F 15/173 |
| DE | 202004021437 U1 * | 4/2008 | ............ | F16F 15/173 |
| DE | 102017004126 A1 * | 10/2018 | | |
| EP | 1081237 B1 | 8/2000 | | |
| JP | H1182631 A | 3/1999 | | |
| WO | 9323687 A1 | 11/1993 | | |
| WO | 2005047640 A2 | 5/2005 | | |
| WO | 20160007689 A1 | 1/2016 | | |

OTHER PUBLICATIONS

Damptech, "21-001 B comparison between different dampers: Rotational friction damper compared to other dampers", 2017, 4 pages.

Fitzgerald, T.F., Anagnos, T., Goodson, M. and Zsutty, T., (1989). "Slotted bolted connections in aseismic design of concentrically braced connections." Earthquake Spectra, 5(2), 383-391.

Grigorian, C. E., Popov, E. P., "Energy Dissipation with Slotted Bolted Connections", Earthquake Engineering Research Center, College of Engineering, University of California at Berkley, Feb. 1994, 255 pages.

Grigorian, C.E. and Popov, E.P. (1993), "Slotted bolted connections for energy dissipation." Proc. ATC-17-1 Seminar on Seismic Isolation, Passive Energy Dissipation, and Active Control, San Francisco, March, 14 pages.

Hohl, et al.; "Prediction and Mitigation of Torsional Vibrations in Drilling Systems"; IADC/SPE-178874-MS; Mar. 2016, IADC/SPE Drilling Conference and Exhibition; 15 pages.

Hohl, et al; "Derivation and Experimental Validation of an Analytical Criterion for the Identification of Self-Excited Modes in Drilling System"; Journal of Sound and Vibration 342; 2015; 13 pages.

International Search Report and Written Opinion for International Application No. PCT/US2019/022198; International Filing Date Mar. 14, 2019; Report Mail Date Jul. 2, 2019 (pp. 1-10).

International Search Report and Written Opinion for International Application No. PCT/US2020/050419; International Filing Date Sep. 11, 2020; Report Mail Date Dec. 15, 2020 (pp. 1-10).

International Search Report and Written Opinion for International Application No. PCT/US2020/050425; International Filing Date Sep. 11, 2020; Report Mail Date Dec. 21, 2020 (pp. 1-10).

International Search Report and Written Opinion for International Application No. PCT/US2020/050430; International Filing Date Sep. 11, 2020; Report Mail Date Dec. 18, 2020 (pp. 1-8).

International Search Report and Written Opinion for International Application No. PCT/US2020/050475; International Filing Date Sep. 11, 2020; Report Mail Date Dec. 23, 2020 (pp. 1-8).

International Search Report, International Application No. PCT/US2019/022196, Date of Mailing Jul. 2, 2019, Korean Intellectual Property Office; International Search Report 4 pages.

International Search Report, International Application No. PCT/US2020/049019, Date of Mailing Dec. 8, 2020, Korean Intellectual Property Office; International Search Report 6 pages.

International Written Opinion, International Application No. PCT/US2019/022196, Date of Mailing Jul. 2, 2019, Korean Intellectual Property Office; International Written Opinion 7 pages.

International Written Opinion, International Application No. PCT/US2020/049019, Date of Mailing Dec. 8, 2020, Korean Intellectual Property Office; International Written Opinion 6 pages.

Oueslati, et al.; "New Insights Into Drilling Dynamics Through High-Frequency Vibration Measurement and Modeling"; SPE 166212; 2013; Society of Petroleum Engineers; 15 pages.

Duff, "An Experimental and Computational Investigation of Rotating Flexible Shaft . . . ", Dissertation, Louisiana State University and Agricultural and Mechanical College; 184 pages; Aug. 2013.

J.R. Bailey & S.M. Remmert; "Managing Drilling Vibrations Through BHA Design Optimization"; SPE Drilling & Completion, vol. 25, issue 4; pp. 458-471; (2010); available at https://www.onepetro.org/journal-paper/SPE-139426-PA.

Khulief et al., "Laboratory investigation of drillstring vibrations", Department of Mechanical Engineering, King Fahd University of Petroleum and Minerals, Dhahran, Saudi Arabia; 15 pages; Apr. 28, 2009.

Khulief et al., "Vibration analysis of drillstrings with self-excited stick-slip oscillations", Department of Mechanical Engineering, King Fahd University of Petroleum and Minerals, Dhahran 31261, Saudi Arabia, Oct. 2005, doi:10.1016/j.jsv.2006.06.06.

Notification of Transmittal of the International Search Report and the Written Opinion of the International Searching Authority, or the Declaration: PCT/US2014/063410; Mailing DateFeb. 12, 2015; 9 pages.

Sahebkar et al., "Nonlinear vibration analysis of an axially moving drillstring system . . . ", Department of Mechanical Engineering, School of Engineering, Tarbiat Modares University, Tehran; 18 pages; 2011.

Xiaohua Zhu et al.,"Research on the effect of drill string impact on wellbore stability", Journal of Petroleum Science and Engineering, http://dx.doi.org/10.1016/j.petrol.2013.08.004, 30 pages; Aug. 1, 2013.

* cited by examiner

VISCOUS VIBRATION DAMPING OF TORSIONAL OSCILLATION

CROSS-REFERENCE TO RELATED APPLICATIONS

This application claims the benefit of U.S. Provisional Application Ser. No. 62/899,354, filed Sep. 12, 2019, U.S. Provisional Application Ser. No. 62/899,291, filed Sep. 12, 2019, U.S. Provisional Application Ser. No. 62/899,331, filed Sep. 12, 2019, and U.S. Provisional Application Ser. No. 62/899,332, filed Sep. 12, 2019, the entire disclosures of which are incorporated herein by reference.

BACKGROUND

Various types of drill strings are deployed in a borehole for exploration and production of hydrocarbons. A drill string generally includes drill pipe or other tubular and a bottomhole assembly (BHA). While deployed in the borehole, the drill string may be subject to a variety of forces or loads. For example, the BHA or other components can experience rotation vibrations having various frequencies. Such vibrations, including high frequency vibrations, can cause irregular downhole rotation, reduce component life and compromise measurement accuracy.

SUMMARY

An embodiment of an apparatus for damping vibrations includes an inertial mass disposed in a cavity in a rotatable downhole component, the rotatable component configured to be disposed in a borehole in a subsurface formation, such as a resource bearing formation, the inertial mass coupled to a surface of the cavity by a damping fluid and configured to move within the cavity relative to the downhole component. The apparatus also includes a damping fluid disposed in the cavity between the inertial mass and an inner surface of the cavity, where rotational acceleration of the rotatable downhole component causes shear in the damping fluid to dissipate energy from rotational acceleration of the rotatable downhole component and causing the rotational acceleration to be reduced.

An embodiment of a method of damping torsional vibrations in a borehole string includes disposing a rotatable downhole component and a damping assembly in a borehole in a subsurface formation, the damping assembly including a cavity that is rotationally fixed relative to the rotatable downhole component, and an inertial mass disposed in the cavity and coupled to the rotatable downhole component by a damping fluid disposed between the inertial mass and the rotatable downhole component. The inertial mass is free to move relative to the rotatable downhole component. The method also includes performing an operation that includes rotating the rotatable downhole component and causes the torsional vibrations of the rotatable downhole component, and damping at least partially the torsional vibrations of the rotatable downhole component. The damping includes causing rotational acceleration to be reduced based on shear occurring in the damping fluid due to relative movement between the inertial mass and the rotatable downhole component.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
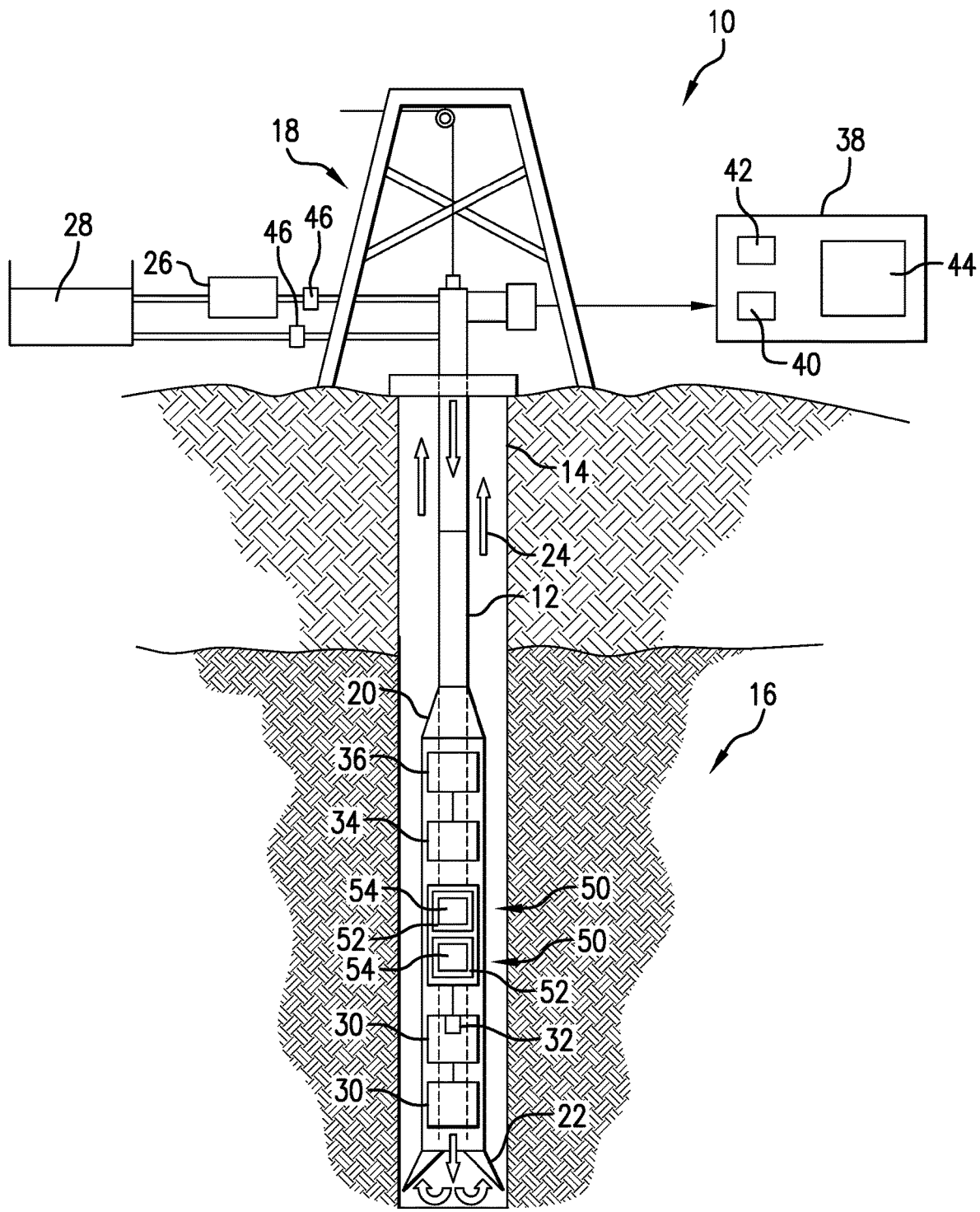
FIG. 1 depicts an embodiment of a drilling and/or formation measurement system including a torsional vibration damping apparatus.

Methods, systems and apparatuses for damping vibrations in downhole components are described herein. An embodiment of a vibration damper, or in the context of this disclosure simply a damper, also known as a damping system, a damping apparatus, or a damping assembly, is configured to be disposed at or in operable communication with a downhole component, and includes a damping fluid in combination with a rotatable inertial mass. A rotatable inertial mass may be any material or component configured to rotate or otherwise move and cause the damping fluid to shear. Shearing of the damping fluid absorbs and dissipates energy produced by downhole component vibrations to reduce the amplitude and/or energy of such vibrations.

In one embodiment, the inertial mass is disposed in a cavity that is rotationally fixed relative to the downhole component. A damping fluid having a selected viscosity (e.g., oil, such as silicon oil) at least partially fills regions of the cavity between the inertial mass and one or more inner surfaces of the cavity. The cavity may be part of a housing fixedly disposed with the downhole component. For example, the housing may be integral with the downhole component (e.g., as a cavity formed within a wall or other part of the downhole component), or may be a separate component that is attached and/or constrained so as to rotate with the downhole component. The cavity and the inertial mass may be of any shape. For example, the cavity can form a rectangular block-shaped, arcuate, toroidal, or cylindrical cavity (or may form one or more segments of an arc, a toroid, or a cylinder) that houses a ring-shaped or arcuate inertial mass (for example a ring segment) having a rotational axis that corresponds to an axis of rotation of the downhole component. As will be appreciated by those skilled in the art, in this disclosure, a "ring" is intended to include one or more segments of a ring that alone or in their entirety form at least a portion of a full 360° ring. In other words, a "ring" as used in this disclosure includes one or more ring segments that may or may not form together a full 360° ring.

The damping assembly may be tuned to dampen one or more selected frequencies. For example, properties such as fluid viscosity, fluid density, fluid compressibility, inertial mass geometry, weight, and density, distance between the inertial mass and a cavity surface (e.g., gap size) and surface roughness can be selected or adjusted to tune the damping assembly to dampen selected vibration frequencies. Notably, selecting or adjusting one or more of the before mentioned properties allows to tune the damping assembly to dampen selected vibration frequencies without any (torsional) spring element, such as a rigid spring element between the inertial mass and the cavity surface. Vibration frequency that is expected and that is to be dampened may be estimated by utilizing modeling (e.g. by numerical modeling tools) that are configured to simulate vibrations such as HFTO in at least portions of borehole strings. In one embodiment, the damping assembly includes a plurality of damping elements arrayed along the rotational axis of the downhole component or a BHA. The damping elements may be tuned to the same frequency or different frequencies.

As noted above, embodiments described herein can be used in energy industry contexts to dampen unwanted vibrations in downhole components. The embodiments are not so limited and can be used in any context or with any device or system for which rotational or torsional vibrations are desired to be reduced or controlled.

Embodiments described herein provide a number of advantages and technical effects. For example, the embodiments provide an effective and relatively simple way to reduce or dampen unwanted or potentially harmful vibrations. In addition, the damping assemblies and/or damping elements can be tuned to dampen vibrations at frequencies known to be harmful or undesirable, can be easily modified, and can be used to dampen multiple frequencies at various locations along a borehole string.

FIG. 1 shows an embodiment of system 10 for performing an energy industry operation (e.g., drilling, measurement, stimulation and/or production). The system 10 includes a borehole string 12 that is shown disposed in a well or borehole 14 that penetrates at least one earth formation 16 during a drilling or other downhole operation. As described herein, "borehole" or "wellbore" refers to a hole that makes up all or part of a drilled well. It is noted that the borehole 14 may include vertical, deviated and/or horizontal sections, and may follow any suitable or desired path. As described herein, "formations" refer to the various features and materials that may be encountered in a subsurface environment and surround the borehole 14.

The borehole string 12 is operably connected to a surface structure or surface equipment 18 such as a drill rig, which includes or is connected to various components such as a surface drive or rotary table for supporting the borehole string 12, rotating the borehole string 12 and lowering string sections or other downhole components. In one embodiment, the borehole string 12 is a drill string including one or more drill pipe sections that extend downward into the borehole 14, and is connected to a bottomhole assembly (BHA) 20.

The BHA 20 includes a drill bit 22, which in this embodiment is driven from the surface, but may be driven from downhole, e.g., by a downhole mud motor. The surface equipment 18 includes components to facilitate circulating borehole fluid 24 such as drilling fluid or mud through the borehole string 12 and an annulus between the borehole string 12 and the borehole wall. For example, a pumping device 26 is located at the surface to circulate the borehole fluid 24 from a mud pit or other fluid source 28 into the borehole 14 as the drill bit 22 is rotated.

In the embodiment of FIG. 1, the system 10 is configured to perform a drilling operation and a downhole measurement operation, and the borehole string 12 is a drill string. However, embodiments described herein are not so limited and may have any configuration suitable for performing an energy industry operation. For example, the system 10 may be configured as a stimulation system, such as a hydraulic fracturing and/or acidizing system.

The system 10 may include one or more of various tools 30 configured to perform selected functions downhole such as performing downhole measurements, facilitating communications, performing stimulation operations and/or performing production operations. For example, one or more of the downhole tools 30 may include one or more sensors 32 for performing measurements such as logging while drilling (LWD) or measurement while drilling (MWD) measurements. Examples of such tools 30 include nuclear magnetic resonance (NMR) tools, resistivity tools, gamma (density) tools, pulsed neutron tools and various others that can employ a variety of sensors 32.

In one embodiment, the system 10 includes a telemetry assembly 34 such as mud pulse telemetry (MPT) system, for communicating with the surface and/or other downhole tools or devices. The telemetry assembly 34 includes, for example a pulser that generates pressure signals through the fluid. In one embodiment, the system 10 includes a steering tool or steering unit, such as a rotary steering unit, a bend sub, or a bend motor, for steering the penetration of the borehole in a desired direction.

One or more downhole components and/or one or more surface components may be in communication with and/or controlled by a processor such as a downhole processor 36 and/or a surface processing unit 38. In one embodiment, the surface processing unit 38 is configured as a surface control unit which measures and/or controls various parameters such as rotary speed, weight-on-bit, fluid flow parameters (e.g., pressure and flow rate) and others.

The surface processing unit 38 (and/or the downhole processor 36) may be configured to perform functions such as controlling drilling and steering, controlling the flow rate and pressure of borehole fluid, transmitting and receiving data, processing measurement data, and/or monitoring operations of the system 10. The surface processing unit 38, in one embodiment, includes an input/output (I/O) device 40, a processor 42, and a data storage device 44 (e.g., memory, computer-readable media, etc.) for storing data, models and/or computer programs or software that cause the processor to perform aspects of methods and processes described herein.

Surface and/or downhole sensors or measurement devices may be included in the system 10 for measuring and monitoring aspects of an operation, fluid properties, component characteristics and others. In one embodiment, the surface processing unit 38 and/or the downhole processor 36 includes or is connected to various sensors for measuring fluid flow characteristics. For example, the system 10 includes fluid pressure and/or flow rate sensors 46 for measuring fluid flow into and/or out of the borehole 14. Fluid flow characteristics may also be measured downhole, e.g., via fluid flow rate and/or pressure sensors in the drill string 12.

Unwanted vibrations can occur during drilling, measurement and other operations due to various factors, such as cutting forces at a drill bit or mass imbalances in downhole tools such as drilling motors. The terms "vibration," "oscillation," as well as "fluctuation," are used with the same broad meaning of repeated and/or periodic movements or periodic deviations from a mean value, such as a mean position, a mean velocity, a mean acceleration, a mean force, and/or a mean torque. These terms are not meant to be limited to harmonic deviations, but may include all kinds of deviations, such as, but not limited to periodic, harmonic, and statistical deviations. Such vibrations can result in reduced rate of penetration, reduced quality of downhole measurements, and can result in wear, fatigue, and/or failure of downhole components. As appreciated by those of skill in the art, different vibrations exist, such as lateral vibrations, axial vibrations, and torsional vibrations. Examples of torsional vibrations include stick/slip of the drilling system and high-frequency torsional oscillations ("HFTO").

Torsional vibrations may be excited by self-excitation mechanisms that occur due to interaction of the drill bit 22 or any other cutting structure (e.g., a reamer bit) and the formation 16. The main differentiator between low frequency torsional oscillations (such as stick/slip) and HFTO is the frequency and typical mode shapes. For example, HFTO have a frequency that is typically above 50 Hz compared to low frequency torsional vibrations that typically have frequencies below 1 Hz. Moreover, the excited mode shape of low frequency torsional vibrations or stick/slip is typically a first mode shape of the whole drilling system whereas the mode shape of HFTO can be of higher order and are commonly localized to smaller portions of a drilling system with comparably high amplitudes at the point of excitation that may be the drill bit or any other cutting structure, (such as a reamer bit), or any contact between the drilling system and the formation (e.g. by a stabilizer).

In accordance with some embodiments of the present disclosure, certain components (e.g., mode-shape tuning elements, specific damper elements, isolator elements, etc.) may be used to permanently achieve a specific response for all HFTO modes at a position. Examples of such components include isolator elements that are shown and described in commonly owned U.S. patent application publication no. 20190284882A1, filed on Mar. 14, 2019 and entitled "Dampers for Mitigation of Downhole Tool Vibrations and Vibration Isolation Device for Downhole Bottom Hole Assembly", U.S. provisional patent application 62/899,331, filed on Sep. 12, 2019 and entitled "Vibration Isolating Coupler for Reducing High Frequency Torsional Vibrations in a Drill String", and U.S. provisional patent application 62/899,332, filed on Sep. 12, 2019 and entitled "Vibration Isolating Coupler for Attenuating Vibrations in a Drill String", all of which are incorporated herein by reference in their entirety. The effect of mode-shape tuning elements on HFTO is shown and described in commonly owned U.S. provisional patent application 62/899,354, filed on Sep. 12, 2019 and entitled "Optimized Placement of Vibration Damper Tools Through Mode-shape Tuning," and U.S. Pat. No. 9,976,405, entitled "Method to Mitigate Bit Induced Vibrations by Intentionally Modifying Mode Shapes of Drill Strings by Mass or Stiffness Changes", all of which are incorporated herein by reference in their entirety. Due to the high frequency of the vibrations, HFTO correspond to high acceleration and torque values along the BHA. Those skilled in the art will appreciate that for torsional movements, one of acceleration, force, and torque is always accompanied by the other two of acceleration, force, and torque. In that sense, acceleration, force, and torque are equivalent in the sense that none of these can occur without the other two. The loads of high frequency vibrations can have negative impacts on efficiency, reliability, and/or durability of electronic and mechanical parts of the BHA.

The system 10 includes a damping system that includes one or more torsional vibration damping elements 50 configured to dampen torsional vibrations such as HFTO. Each damping element 50 includes a cavity 52 disposed in the BHA 20 or other rotating or rotatable downhole component. One or more damping elements 50 can be located at any suitable location, such as between drill pipe and the BHA 20, within the BHA 20 (for example, as a separate damper element sub or within a tool of the BHA, such as within a motor, an LWD/MWD tool, or within a steering unit), between the BHA 20 and the drill bit 22, and within the drill bit 22. In addition, as discussed further below, multiple damping elements 50 can be disposed at desired locations (e.g., at portions of the borehole string subject to HFTO) and can be configured to dampen different vibrational frequencies. For example, one damping element may be configured to dampen vibrations at about a first frequency, such as at about 100 Hz, while another damping element may be configured to dampen vibration at about a second frequency, such as at about 150 Hz, etc.

An inertial mass 54 is disposed within the cavity 52, and a damping fluid 56 (shown in FIG. 2) at least partially fills the cavity 52 so that the damping fluid 56 is in contact with both an inner surface of the cavity 52 and an outer surface of the inertial mass 54. In this manner, a thin film (having any desired thickness) of the damping fluid 56 couples the inertial mass 54 to a housing 60 or other component having the cavity 52. As discussed further below, vibrations of a downhole component cause relative opposing and oscillating movement of the inertial mass 54 and inner surfaces of the cavity 52. Rotational acceleration (changes in the rate of rotation) of the inertial mass 54 and inner surfaces causes shear in the damping fluid 56, which acts to dissipate energy from the vibrations and thereby dampen the vibrations. The vibration amplitudes of the BHA 20 are reduced by the vibration energy being absorbed and converted to heat in shearing the film of damping fluid between the inertial mass 54 and the housing 60.

In some applications, the (shear) stresses in the damping fluid 56 between the inertial mass 54 and the inner surface of the cavity 52 may be selected to achieve a (damping) force that acts in the direction of the tangential acceleration and associated harmonic movement to damp torsional oscillations, such as HFTO. The damping fluid 56 provides a damping force between the inertial mass 54 and the inner surface of the cavity 52. In this case, the inertial mass 54 may be incorporated with a closed housing 60 and, potentially, a well-defined geometry of the gaps between the inertial mass 54 and the housing 60. In hydraulic damping, the viscous damping forces may be sensitive to parameter changes of the gaps and the damping fluid 56. Therefore, a temperature insensitive damping fluid 56 or a fluid that is less sensitive to temperature may be preferred. Fluids with different shear stresses as a function of the shear rate can be used to achieve a beneficial behavior. Some such example fluids include, without limitation, Newtonian fluids, dilatant (e.g., shear-thickening fluids), pseudoplastic, Bingham plastic, Bingham pseudoplastic fluids, etc. Advantageously, solids may be added to the damping fluid 56 to achieve dispersive behavior of the damping fluid 56.

An example of the damping fluid 56 is silicon oil or other fluid having a viscosity between about 10,000 to 1000,000 centistokes at room temperature. Another example of the damping fluid 56 is to use the same fluid as the borehole fluid 24. For example, the cavity 52 may be open to the borehole 14 and may allow borehole fluid 24 to flow in/through cavity 52. Other examples include hydrocarbon-based oils.

The inertial mass 54 is configured to rotate or otherwise move relative to the cavity 52 and associated downhole component to cause shear in the damping fluid 56. In one embodiment, the amount of energy dissipated (e.g., the dissipated shear loss due to fluid shear) by the damping fluid has a non-linear relationship to rotary acceleration. For example, the damping fluid is a fluid that over-proportionally dissipates higher energy at higher rotational rates, i.e., the rate of increase of the dissipated shear loss as a function of rotary acceleration is higher at high accelerations (accelerations above a given or selected acceleration) than at lower accelerations. In other examples, the damping fluid 56 is configured to under-proportionally dissipate more energy at higher rotary acceleration, or is configured to proportionally dissipate more energy at higher rotary acceleration (i.e., has a substantially linear relationship to acceleration).

It is noted that the types of damping fluids described herein are provided as examples, and embodiments described herein are not limited to these examples and may include any type of fluid having a desired viscosity. In addition, the damping assemblies and/or damping elements may be disposed in or in operable communication with any rotatable downhole component.

Figure 2:
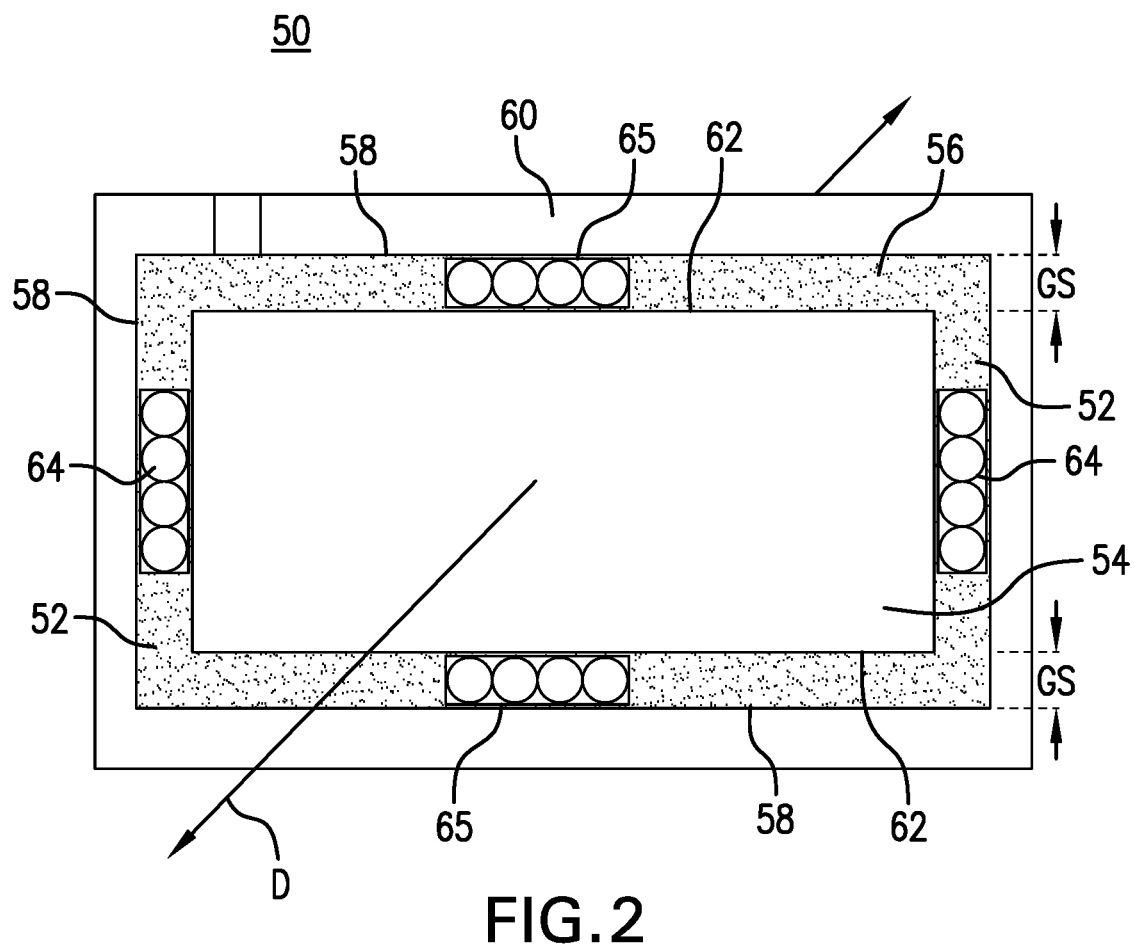
FIG. 2 depicts aspects of an embodiment of a damping element including a rotatable inertial mass and a damping fluid.

FIG. 2 shows an embodiment of a damping element having a cavity 52 and an inertial mass 54. The cavity 52 houses the inertial mass (e.g., a ring) and a damping fluid 56 (e.g., silicon oil) that at least partially fills the spaces in the cavity 52 between the inertial mass 54 and inner surfaces 58 of the cavity 52.

The cavity 52 may be formed within a housing 60 that is rotationally fixed relative to the BHA 20 or other downhole component. As such, the housing 60 will rotate and vibrate with the downhole component. The housing 60 may be a separate housing attached to the downhole component (e.g., on an inner surface of a central fluid conduit of the component) or may be integral with the downhole component. For example, the housing 60 can be the wall of a tubular or other part of a component.

As a downhole component vibrates, the inertial mass 54 and the inner surfaces 58 move opposing oscillating motions along a direction D, which may be a curved or arcuate direction. Advantageously, inertial mass 54 is free to move, respectively rotate, relative to cavity 52. The term "free to move" is not meant to be limited to movement that is free of any forces, such (viscous) friction forces. Instead, "free to move" is meant to include that the inertial mass 54 is configured to rotate relative to the cavity 52 a partial revolution, a full revolution or even several revolutions, such as an arbitrary or infinite number of revolutions. For example, movement or rotation of the inertial mass 54 may not be restricted in at least one direction by barriers or spring elements in the direction of movement or rotation relative to cavity 52. In an embodiment, a damping effect of the inertial mass 54 relative to the inner surfaces 58 is based only on viscous friction, for example without including torsion, stretching, and/or elastic deformation of an associated spring element, or without including a spring constant, such as a torsion spring constant. Because the inertial mass 54 is free to move, respectively rotate, the inertial mass 54 exhibits an opposing oscillating motion (acceleration). Inner surfaces 58 of the cavity 52 and outer surfaces 62 of the inertial mass 54 apply opposing shear stresses ("τ") on the damping fluid 56, which counteract vibrations of the downhole component. The inner surfaces 58 and/or the outer surfaces 62 may be coated with a layer of material having a selected roughness (or roughnesses), or the surfaces themselves may be treated to have selected roughnesses (e.g. surfaces may be grit blasted or shot peened) that, in combination with fluid viscosity and gap size, support viscous shear to dampen a selected frequency or frequencies. In addition, the inertial mass 54 may comprise drills, grooves, or slits (not shown) of a selected size (for example of same, smaller, or larger diameter or width than the distance between the inertial mass 54 and cavity surfaces 58) to provide for an increased outer surface 62 of inertial mass 54 in contact with damping fluid 56.

The damping element 50 can be configured to dampen torsional vibrations of downhole components at selected frequencies. For example, properties such as fluid viscosity, fluid density, and fluid compressibility, distance between the inertial mass 54 and cavity surfaces 58 (such as a gap size GS shown in FIG. 2), inertial mass geometry, weight, and density), and surface roughness can be selected or adjusted to tune the damping element 50 to dampen selected vibration frequencies. Vibration frequency that is expected and that is to be selected for damping may be estimated by utilizing modeling (e.g. by numerical modeling tools) that are configured to simulate HFTO in at least portions of borehole strings.

The damping element 50 may include additional components to facilitate damping. For example, one or more bearing assemblies, such as ring bearings, roller bearings, ball bearings, and friction bearings can be positioned between the inertial mass 54 and inner surface(s) 58 of the cavity 52 to maintain the inertial mass 54 at a selected position or within a selected range to maintain a minimum gap size. Bearing surfaces can be included at axial ends of the inertial mass 54 (ends located along a direction parallel to a rotational axis) and/or at radial ends of the inertial mass 54 (ends arrayed along a radial direction orthogonal to the rotational axis). For example, axial bearing assemblies 64 and radial bearing assemblies 65 may be disposed between the inertial mass 54 and cavity surfaces 58. The number of bearing assemblies is not limited to the number shown in this embodiment. For example, for radial support, one or more than the two shown radial bearing assemblies 65 may be sufficient to provide guidance between the surfaces 58 and the inertial mass 54. The gap size variation may be further limited by one or more spacer elements (not shown), for example elastic spacer elements, and may be selected to have any suitable size. An example of a gap size is in the range of 0.01 to about 2 cm, such as 0.01 to about 5 mm, for example about 0.1 to about 1.5 mm, or about 0.2 mm to about 0.5 mm. It is noted that the gaps between the inertial mass 54 and the surfaces 58 may be further filled with some material (not shown) having a porous and/or elastic structure (e.g. metal wool, steel wool, wire wool, mineral wool, glass wool, fiber glass, or a sponge) that further defines a tortuosity. The porous and/or elastic structure may be in fixed contact with surfaces 58 and may increase the contact area between damping fluid 56 and solid material that is fixedly connected to surface 58. The elastic behavior as well as the tortuosity of the porous and/or elastic structure in contact with damping fluid 56 may further dissipate energy and, thus dampen vibration.

Further, while FIG. 2 shows one inertial mass 54 in cavity 52, this is not meant to be a limitation. Advantageously, two or more inertial masses may be included in cavity 52 and damping fluid 56 may be present between the two or more inertial masses as well as between the two or more inertial masses and the cavity surfaces 58. Advantageously, one or more internal surfaces (not shown) may be installed in cavity 52 that are integral with or fixedly connected to cavity 52. Like inner surfaces, internal surfaces and the outer surfaces of the one or more inertial masses apply opposing shear stresses on the damping fluid 56. An embodiment with two or more inertial masses and internal surfaces in cavity 52 is explained and discussed in more details with respect to FIGS. 9 and 10.

Figure 3:
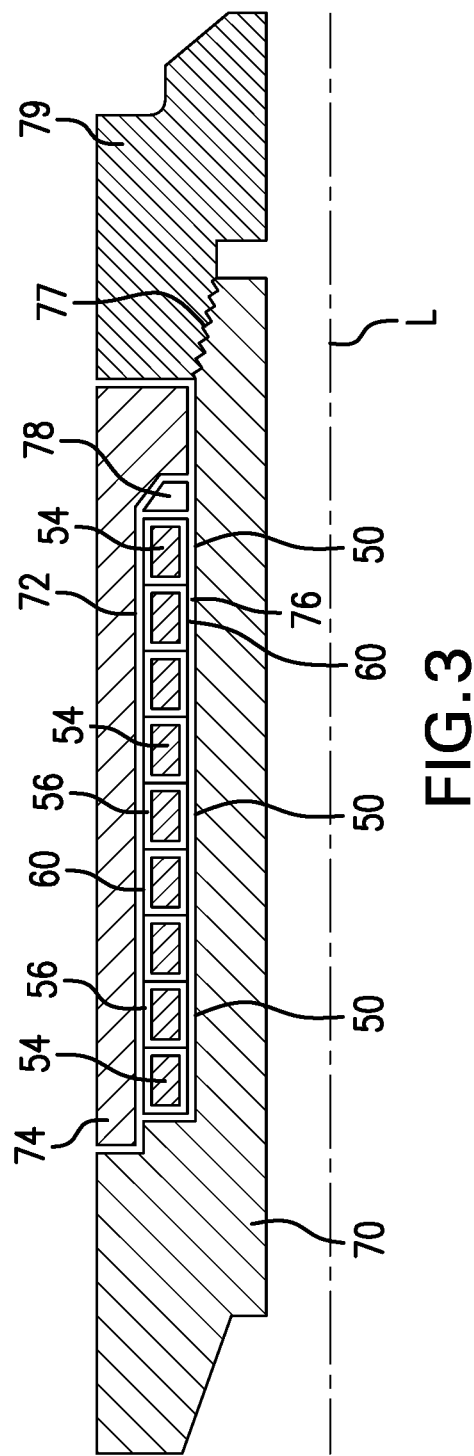
FIG. 3 depicts an embodiment of a damping system having a plurality of damping elements.

In one embodiment, the damping element 50, or multiple damping elements 50, include a cylindrical or arcuate cavity 52 and inertial mass 54. For example, as shown in FIG. 3, one or more circular or ring-shaped damping elements 50 are disposed in a downhole component having an elongated downhole component body 70 that is rotatable about a longitudinal rotational axis L. Each damping element 50 includes a respective cylindrical housing 60 in which a rotatable ring-shaped mass 54 and a damping fluid 56 are disposed. In one embodiment, each housing 60 is sealed to isolate the damping fluid 56 therein from surrounding components, and to prevent leakage. Alternatively or in addition, each housing 60 is pressure compensated, e.g. pressure compensated with respect to the borehole fluid 24, e.g. by a one or more bellows, e.g. rubber bellows, between the inside and the outside of the housing 60.

In one embodiment, one or more damping elements 50 are disposed within an outer chamber 72. An example of an outer chamber 72 is shown in FIG. 2, which is formed by the downhole component body 70 and a cover 74. The chamber 74 may be an individual chamber housing a single damping element 50, or a chamber housing multiple damping elements 50. For example, the chamber 72 is a cylindrical chamber that houses an array of damping elements 50. The chamber 72 may be formed integral with the component, e.g., as a cavity in the downhole component body 70.

The chamber 72 may be a sealed chamber that is isolated from external fluids and/or downhole pressures. For example, the chamber 72 may be pressurized to atmospheric pressure or other pressure.

In one embodiment, the chamber 72 includes a thermally conductive material, such as a thermally conductive fluid 76 or a thermally conductive rigid component or layer that at least partially surrounds each damping element 50 or is otherwise in contact with inertial mass 54 and/or damping fluid 56. The thermally conductive material is configured to transfer heat energy, e.g. heat generated by viscous shear, and dissipate the energy into the downhole component body 70, the cover 74 and/or annular region of a borehole. In one example, the heat conductivity of thermally conductive material is greater than at least one of the inertial mass 54, the damping fluid 56, the housing 60, the downhole component body 70, and the cover 74. In another example, the damping fluid 56 itself has a heat conductivity that is greater than at least one of the inertial mass 54, the damping fluid 56, the housing 60, the downhole component body 70, and the cover 74. Examples of thermally conductive materials include epoxies, silicones, urethanes, acrylates, water, glycol solutions, thermal paste or grease, oil, and (liquid or solid) metal, such as galinstan or copper. Thermally conductive fluids may include aluminum oxide, boron nitride, zinc oxide, aluminum nitride, silver particles, or gallium.

The plurality of damping elements 50 may be clamped or otherwise secured to the downhole component by a thrust loading component 78. The thrust loading component 78 exerts axial force on the housings 60 to avoid relative slipping by friction forces between the housings 60 and the component and between adjacent housings 60. For example, the downhole component body 70 includes a thrust loading component 78 such as a thermally expandable loading ring that applies an axial force perpendicular to the rotational axis L.

In one embodiment, the damping elements 50 or the housings 60 may be locked to the downhole component (e.g., the downhole component body 70 and/or the cover 74) or to a neighboring housing by means of a locking element, such as a key, a press fit, a screw, by adhesive, by welding, or other means to connect components.

In one embodiment, the damping elements 50 or housings 60 may be locked by elastic compression of the housing 60 wall. The force for the elastic compression might be exerted (e.g., in addition to or in place of the thrust loading component 78) through an internal thread 77, e.g. an internal thread 77 that connects the downhole component body 70 to a neighboring component 79 (or components). By adjusting the required compression to prevent movement of the housings 60 with respect to the downhole component body 70 and/or the cover 74 during assembly, the elastic compression can be precisely controlled. Such adjustment can be achieved by means of, for example, shims (not displayed) or by selection of width of the thrust loading component 78. Elastic compression of the housing 60 length can be in a range of about 0.1% to 3%, depending on the expected torsional vibration acceleration.

In another embodiment, multiple damping elements 50 are disposed within an outer chamber 72. Each of the multiple damping elements 50 is filled with a damping fluid 56. The viscosity of the damping fluid 56 is selected to have an optimum damping characteristic at a selected frequency. Tuning the damping elements 50 to different optimum frequencies widens the operation window. While one damping element may react with optimum (maximum) energy dissipation at one frequency, another damping element may react in an optimum manner at another frequency. Frequency tuning of damping elements can be done in multiple ways. For example, with a given shear gap size GS, the frequency can be tuned by changes of the fluid viscosity, fluid density, and fluid compressibility as explained above. Frequency can also be tuned by the inertia of the inertial mass 54, which in turn is a function of geometry, weight or mass, density, and surface roughness of the inertial mass 54. Alternatively, with a given inertia of the inertial mass 54 and a set viscosity, the gap size GS of each of the multiple damping elements can be manipulated to have an optimum damping at a selected frequency. Notably, selecting or adjusting one or more of the before mentioned properties allows to tune the damping assembly to dampen selected vibration frequencies without any (torsional) spring element, such as a rigid spring element between inertial mass 54 and housing 60. Vibration frequency that is expected and that is to be selected for damping may be estimated by utilizing modeling (e.g. by numerical modeling tools) that are configured to simulate HFTO in at least portions of borehole strings.

Figure 4:
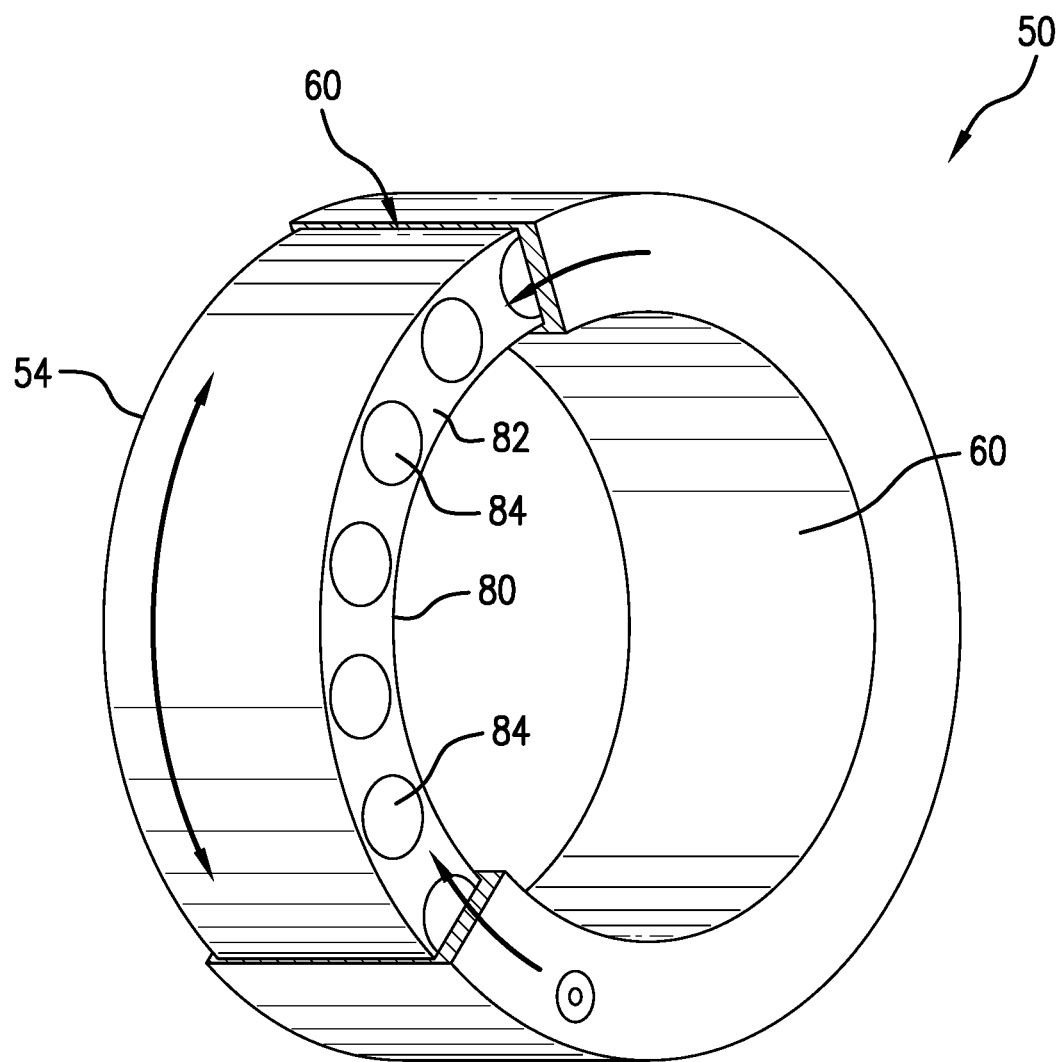
FIG. 4 depicts an embodiment of a damping system including a rotatable inertial ring and a damping fluid.
Figure 5:
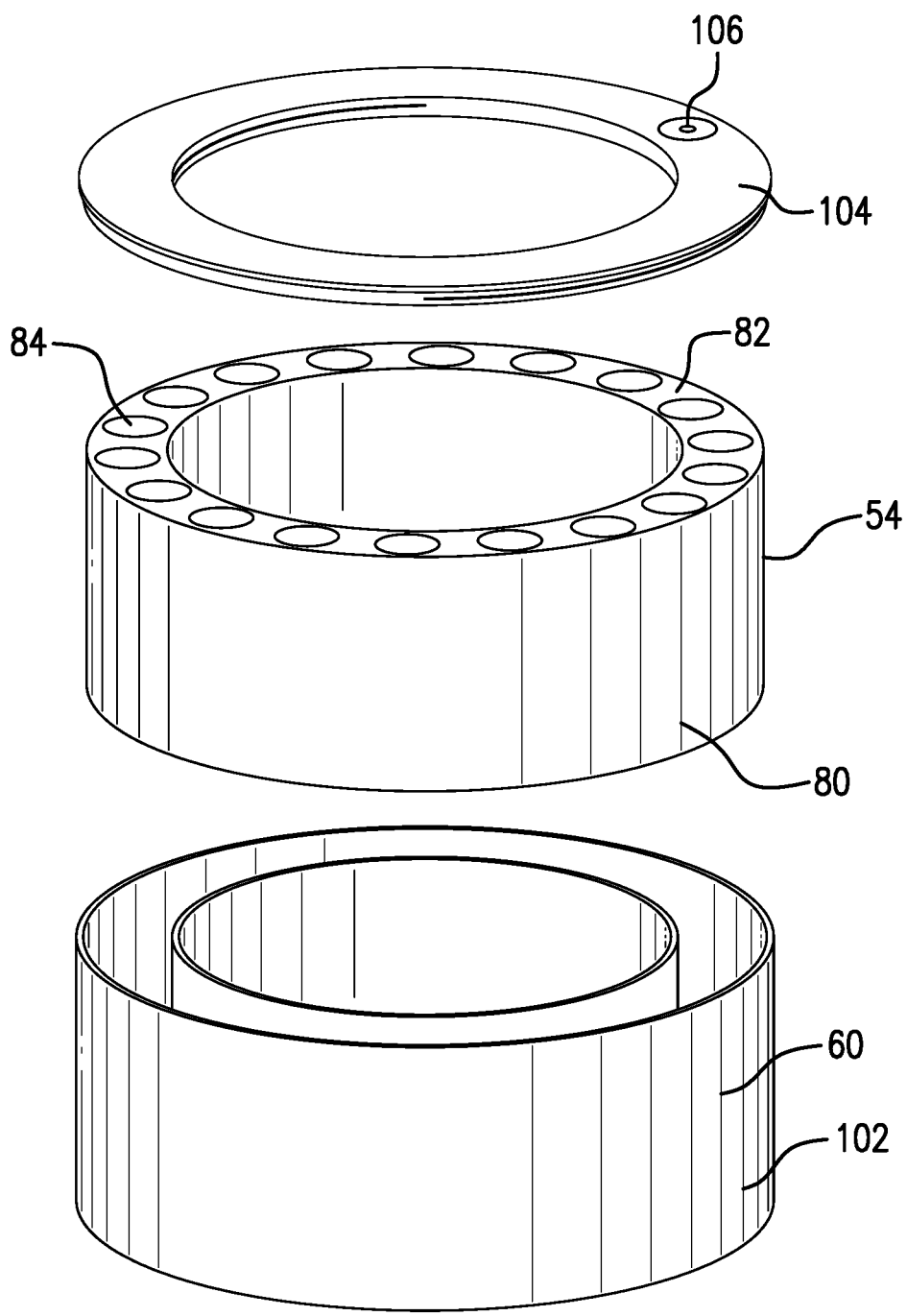
FIG. 5 depicts the damping system of FIG. 4 in a disassembled condition.

FIGS. 4 and 5 show an embodiment of the damping element 50. FIG. 4 is a partially dissected view of this embodiment of the damping element 50, and FIG. 5 is a disassembled view of this embodiment of the damping element 50.

In this embodiment, the inertial mass 54 is made from a cylindrical ring-shaped body (ring) 80 having a shape and size configured to establish a selected gap size between an outer surface of the inertial mass 54 and an internal surface 58 of the housing 60. The ring-shaped inertial mass 54 has an overall density that is selected to configure the damping element 50 to dampen vibrations having a selected frequency. In this embodiment, the housing 60 encapsulates the ring-shaped inertial mass 54, has a similar shape as the inertial mass 54, and has a size and dimensions that establish selected distances or gap sizes between the outer surfaces 62 of the inertial mass 54 and the inner surfaces 58 of the housing 60. The housing 60 may be made of steel or other suitable material.

The inertial mass 54 may include a plurality of components that have different densities. In one embodiment, the inertial mass 54 includes at least one first component having a first density and at least one second component having a second different density.

For example, the body 80 of the ring-shaped inertial mass 54 of FIG. 4 is made of a first material 82 and a second material 84 disposed within the body. The first material 82 may be copper, a copper alloy, aluminum, steel or any other suitable material, and the second material 84 can be a material having a higher or a lower density than the first material, such as tungsten or a tungsten alloy. In the example of FIG. 4, the second material 84 includes a plurality of tungsten or tungsten alloy rod-shaped inserts. The inserts are arrayed within the first material 82 (e.g., a copper ring having holes for the inserts) so that the weight and density is balanced.

Figure 6:
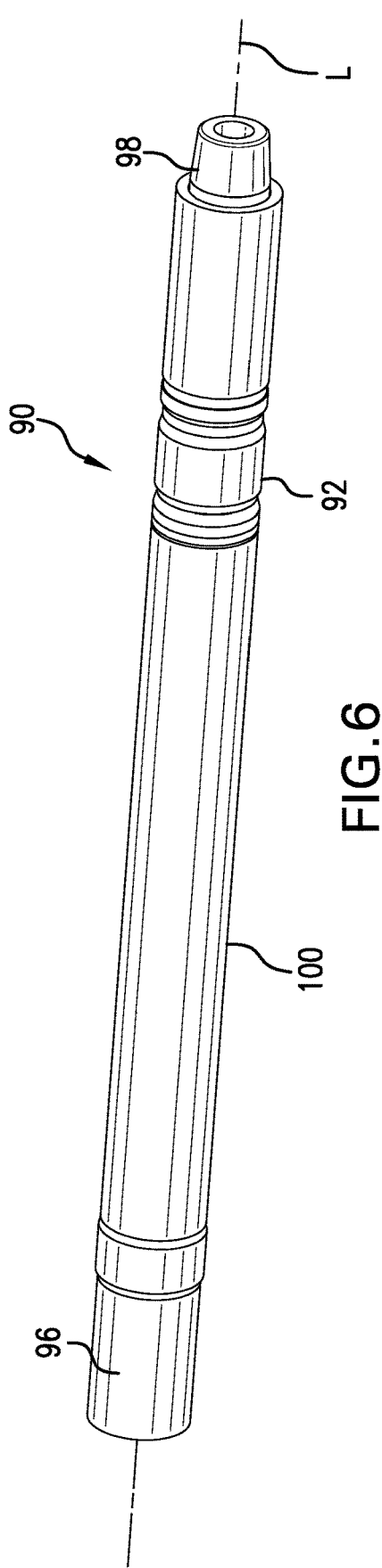
FIG. 6 depicts an embodiment of a downhole damping assembly configured to be deployed in a borehole in a resource bearing formation.
Figure 7:
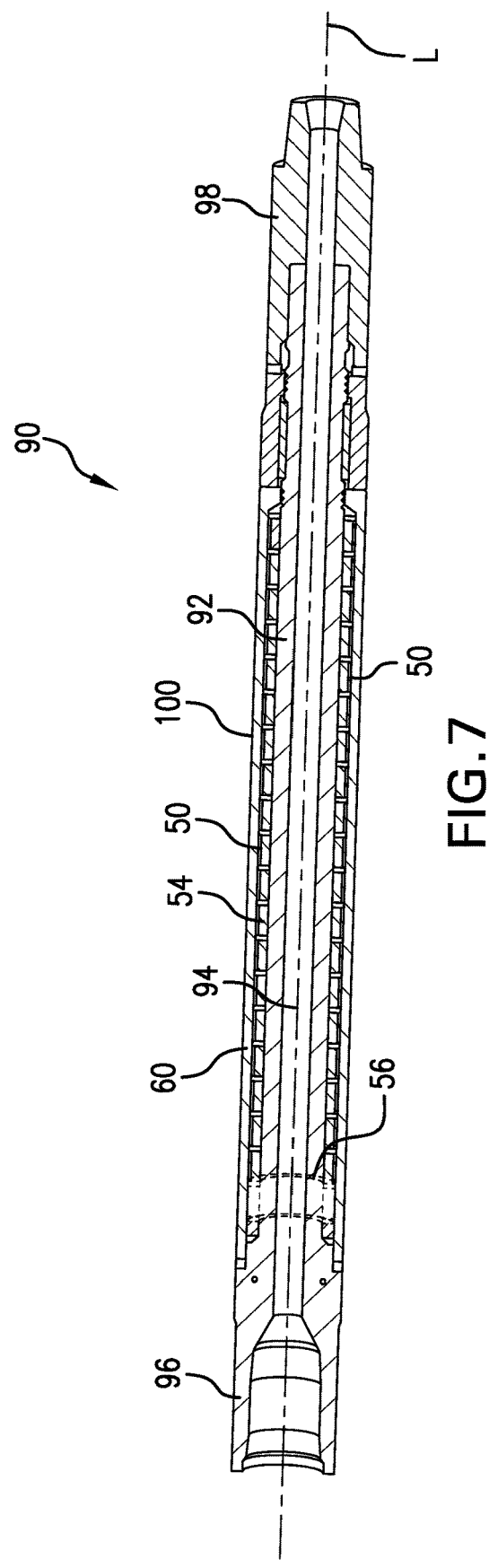
FIG. 7 is a cross-sectional view of the damping component of FIG. 6.

FIGS. 6 and 7 are perspective views of an example of a downhole component that incorporates one or more damping elements described herein. In this example, the downhole component is a damping component or damping element sub 90, which includes an elongated tubular body 92 that extends along and is rotatable about a central longitudinal axis L. The damping element sub 90 includes a fluid conduit 94, such as a central fluid conduit 94 that may be in fluid communication with borehole fluid 24, for example a drilling fluid or mud conduit, a production fluid conduit, an injection fluid conduit and/or any number of conduits or flow paths that permit fluid communication between a downhole location and a surface location. The damping element sub 90 also includes one or more connectors such as a box connector 96 and a pin connector 98 configured to operatively connect to one or more neighboring components, such as the neighboring component 79, a drill pipe, downhole motor, a BHA 20, or a drill bit 22. Ultimately, the drill bit 22 is operatively connected to a drive, such as a downhole motor or a surface drive/rotary table via the box connector 96 and pin connector 98 in a way that the drive rotates drill bit 22 by rotating damping element sub 90 in operative connection to the drive and drill bit 22. Optionally, damping element sub 90 may include a wire (not shown) or other electrical connection from box connector 96 and pin connector 98 in order provide data and/or power from below the damping element sub 90 to above the damping element sub 90 and/or vice versa to communicate and/or provide power to other portions of BHA 20.

The damping element sub 90 includes a plurality of damping elements 50 that are arrayed axially along the tubular body 92. Each damping element 50 includes a ring-shaped inertial mass 54 (also referred to as an inertial mass ring 54), which is disposed within a cylindrical housing formed within or attached to the tubular body 92. Advantageously, the ring-shaped inertial mass 54 is disposed around the fluid conduit 94 (e.g. eccentric to fluid conduit 94 or at a greater radial distance from central longitudinal axis L than fluid conduit 94) to provide a larger diameter of the ring-shaped inertial mass 54 and, thus, greater inertia. Each damping element 50 also includes a ring-shaped housing 60 that houses the inertial mass ring 54 and a damping fluid 56. Each inertial mass ring 54 is allowed to rotate, i.e. is rotatable about the central axis L and/or central fluid conduit 94 to counteract torsional or rotational vibrations and/or dissipate energy from such vibrations.

The damping elements 50 may be configured to dampen one selected frequency or frequency range, or one or more of the damping elements 50 may be configured to dampen a different frequency range than one or more other damping elements 50. In this way, the damping element sub 90 can be configured to dampen any number of different vibration frequencies.

Although ring elements are shown for the inertial mass 54, the inertial mass 54 may have other geometries. The inertial mass 54 may include multiple bodies that are mechanically connected, such as displayed in FIG. 4 (first material 82 and a second material 84). The bodies can be mechanically connected in any suitable manner (e.g., by screwing, adhesives, welding, clamping, press fit, by using memory shape materials, etc.). Bodies from the first material 82 and/or bodies from the second material 84 may be taken from a preconfigured set of bodies from which a body with appropriate density can be selected according to the vibration frequency that is to be dampened. Vibration frequency that is expected and that is to be dampened may be estimated by utilizing modeling (e.g. by numerical modeling tools) that are configured to simulate HFTO in at least portions of borehole strings. In one embodiment, the inertial mass 54 includes multiple bodies that may not be mechanically connected. Since the inertia of an individual unconnected body reacts in a similar manner by its own inertia to vibrations, creating viscous shear and therefore damping, similar physics apply to the overall damping of multiple unconnected bodies inside a fluid filled cavity. Alternatively or in addition, the inertial mass 54 includes multiple bodies that may be in a rather loose elastic contact (for example, by elastically connecting the multiple bodies, e.g. by one or more springs (not shown) or a material (not shown) having a porous and/or elastic structure (e.g. metal wool, steel wool, wire wool, mineral wool, glass wool, fiber glass, or a sponge) that further defines an elasticity and/or a tortuosity.

The damping element sub 90, in one embodiment, includes an outer housing 100 that maintains the damping elements at fixed axial positions along the tubular body 92. For example, a tubular cover may be disposed over the damping elements 50 and sealed to the tubular body 92 to isolate the damping elements 50. In one embodiment, each housing 60 is sealed to isolate the damping fluid 56 therein from surrounding components, and to prevent leakage. Alternatively or in addition, each housing 60 is pressure compensated, e.g. pressure compensated with respect to the borehole fluid 24, e.g. by one or more bellows, e.g. rubber bellows, between inside and outside of the housing 60. A thermally conductive material, such as a thermally conductive fluid or a thermal conductive rigid component or layer may be injected into the outer housing 100, so that the thermally conductive material at least partially surrounds the damping elements 50 or is otherwise in contact with inertial mass 54 and/or damping fluid 56 to facilitate energy dissipation. In one example, the heat conductivity of the thermally conductive material is greater than at least one of the inertial mass 54, the damping fluid 56, the housing 60, the tubular body 92, and/or the outer housing 100. In another example, damping fluid 56 itself has a heat conductivity that is greater than at least one of the inertial mass 54, the damping fluid 56, the housing 60, the tubular body 92, and/or the outer housing 100. Examples of thermally conductive materials include epoxies, silicones, urethanes, acrylates, water, glycol solutions, thermal paste or grease, oil, and (liquid or solid) metal, such as galinstan or copper. Thermally conductive fluids may include aluminum oxide, boron nitride, zinc oxide, aluminum nitride, silver particles, or gallium.

Figure 8:
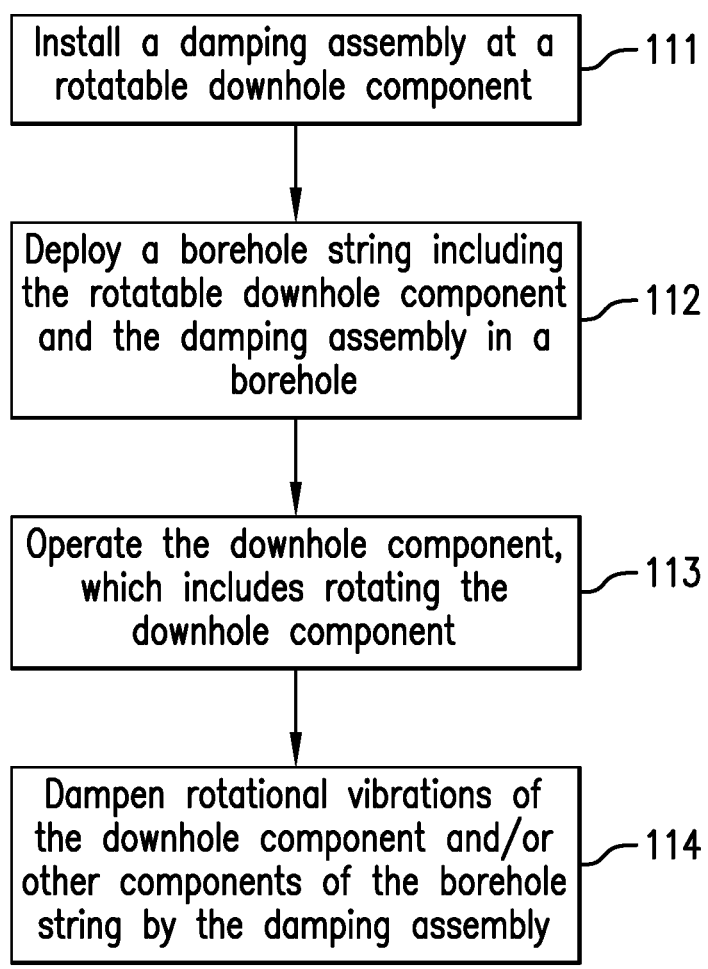
FIG. 8 is a flow chart that depicts an embodiment of a method of performing aspects of a downhole operation and damping or otherwise modifying, reducing and/or controlling torsional vibrations in a downhole component.

FIG. 8 illustrates a method 110 of performing an energy industry operation and damping vibrations of a downhole component. The method 110 may be performed in conjunction with the system 10, but is not limited thereto. The method 110 includes one or more of stages 111-114 described herein, at least portions of which may be performed by a processor (e.g., the surface processing unit 38). In one embodiment, the method 110 includes the execution of all of stages 111-114 in the order described. However, certain stages may be omitted, stages may be added, or the order of the stages may be changed.

Aspects of the method are also described in conjunction with FIG. 5, which shows an embodiment of the damping element 50 having a ring-shaped inertial mass 54 and corresponding ring-shaped or cylindrical housing 60.

In the first stage 111, a damping assembly comprising at least one damping element 50 of FIG. 5 is assembled and installed with a downhole component, such as around the fluid conduit 94 of the damping element sub 90, or corresponding fluid conduits of a section of drill pipe or the BHA 20. In one embodiment, multiple damping elements 50 are disposed in a longitudinal array.

The housing 60 of each damping element 50 is selected to have a selected size and geometry, and the inertial mass 54 is selected to have a corresponding size and geometry so that, when a damping fluid and the inertial mass 54 are disposed in the housing 60, a selected gap size is established. For example, referring to FIG. 5, the housing 60 includes a base portion 102 and a cover 104. Damping fluid can be poured into the base portion and the inertial mass 54 inserted therein to displace the damping fluid and fill the cavity around the inertial mass 54. The cover 104 in this example is then sealed to the base portion 102. Alternatively, damping fluid can be injected in the spaces between the inertial mass 54 and the housing 60 after the inertial mass 54 and the housing 60 are assembled.

In one embodiment, the housing 60 includes a fluid port 106 that can be used to inject a damping fluid, such as silicon oil. The fluid port 106 may include a check valve, bleed valve or other suitable mechanism to allow an amount of the damping fluid to be ejected in the event that thermal expansion of the damping fluid can cause undue stress or pressure in the cavity.

In one embodiment, the damping element 50 is configured and assembled to account for thermal expansion that may occur. Downhole components are often exposed to high temperatures, which may cause various parts of the damping element 50 and downhole components to undergo some amount of thermal expansion. As such, the materials making up the inertial mass 54 and the housing 60 may be selected to undergo a known amount of expansion. For example, the inertial mass 54 is configured to selectively thermally expand at a selected (e.g., higher) rate than the housing 60 or other components, such as side rings (as discussed below with respect to FIGS. 9 and 10), such that expansion results in a gap size that becomes smaller at a higher temperature, thereby creating higher damping at higher temperature through smaller gap size. Since higher temperature reduces the viscosity of the damping fluid, thus reducing the damping for given geometry, an increase in damping at higher temperature through reduction of gap size can be beneficial.

Both effects might be selected to at least partially balance each other, hence a constant damping as a function of temperature can be achieved.

Different damping fluids have different behavior with respect to shear velocity. Some fluids provide velocity weakening resistance, others have a linear proportional behavior (like silicon fluid), yet others show over proportional increase in shear with respect to velocity. In some aspects, over proportional damping as a result from over proportional increase in shear with respect to velocity can be beneficial to create higher damping at higher acceleration (and velocity), while still remaining sensitive to smaller rotary acceleration.

To account for thermal expansion, in one embodiment, damping fluid is injected into the cavity so that the cavity spaces between the inertial mass 54 and the housing 60 are only partially filled. The cavity spaces are filled to an extent such that, when the cavity spaces shrink or the damping fluid expands due to thermal expansion, the damping fluid completely fills the cavity spaces. For example, after the inertial mass 54 and the housing 60 have been assembled, the remaining cavity volume is filled (e.g., via the fluid port 106) with a damping fluid at room temperature so that the damping fluid fills about 98% or more of the remaining volume. Alternatively or in addition, one or more pressure relief valves, bleed valves and/or other pressure compensation devices may be utilized as described and discussed above and below.

In the second stage 112, a downhole component including or operably connected to one or more damping elements is deployed into a borehole. For example, the borehole string 12 including one or more damping elements 50 (e.g., as a damping element sub 90 disposed on top or at an end of the BHA 20, for example between the BHA 20 and the drill bit 22) is deployed into the borehole 14. For example, depending on the position of the one or more damping elements 50 with respect to the BHA 20 (e.g. if one or damper is located outside of the BHA or at the top or the bottom of the BHA) a damper element or a damping element sub maybe utilized without electrical connection and/or a damper element or a damping element sub may be utilized that is not wired from the top to the bottom of the damping element or the damping element sub.

In the third stage 113, an energy industry operation is performed that includes rotating the downhole component. For example, a drilling and/or LWD operation is performed using the system 10. In the fourth stage 114, during operation, the one or more damping elements 50 (e.g., the damping element sub 90) act to dampen selected torsional or rotational vibration frequencies as discussed above.

Figure 9:
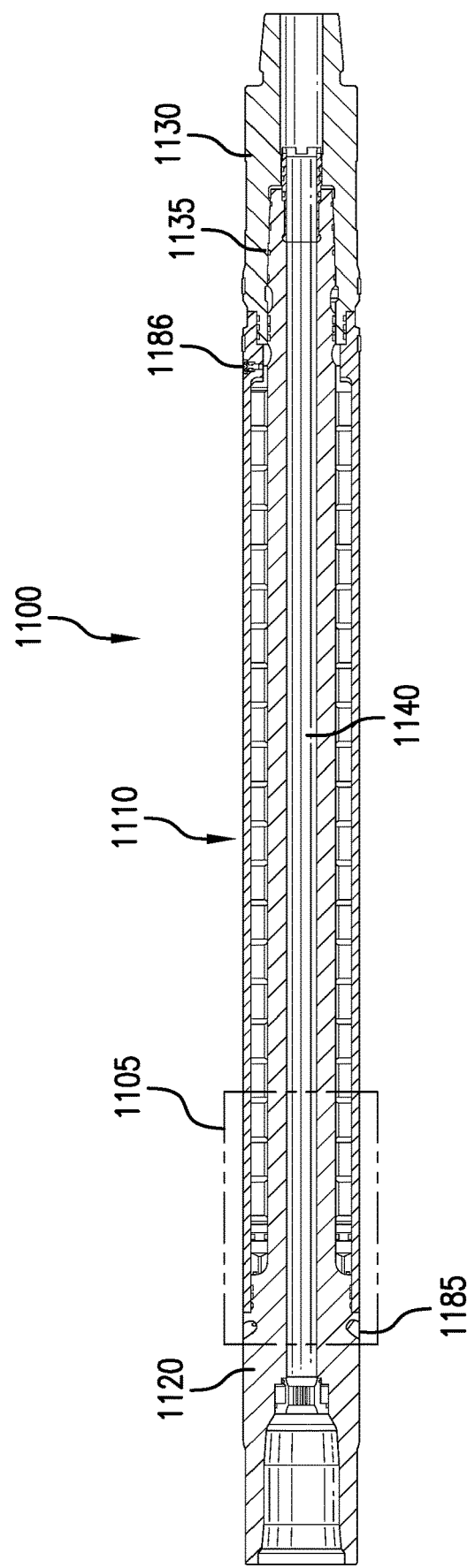
FIG. 9 depicts an embodiment of a damping system including two or more inertial masses that are not sealed against each other.
Figure 10:
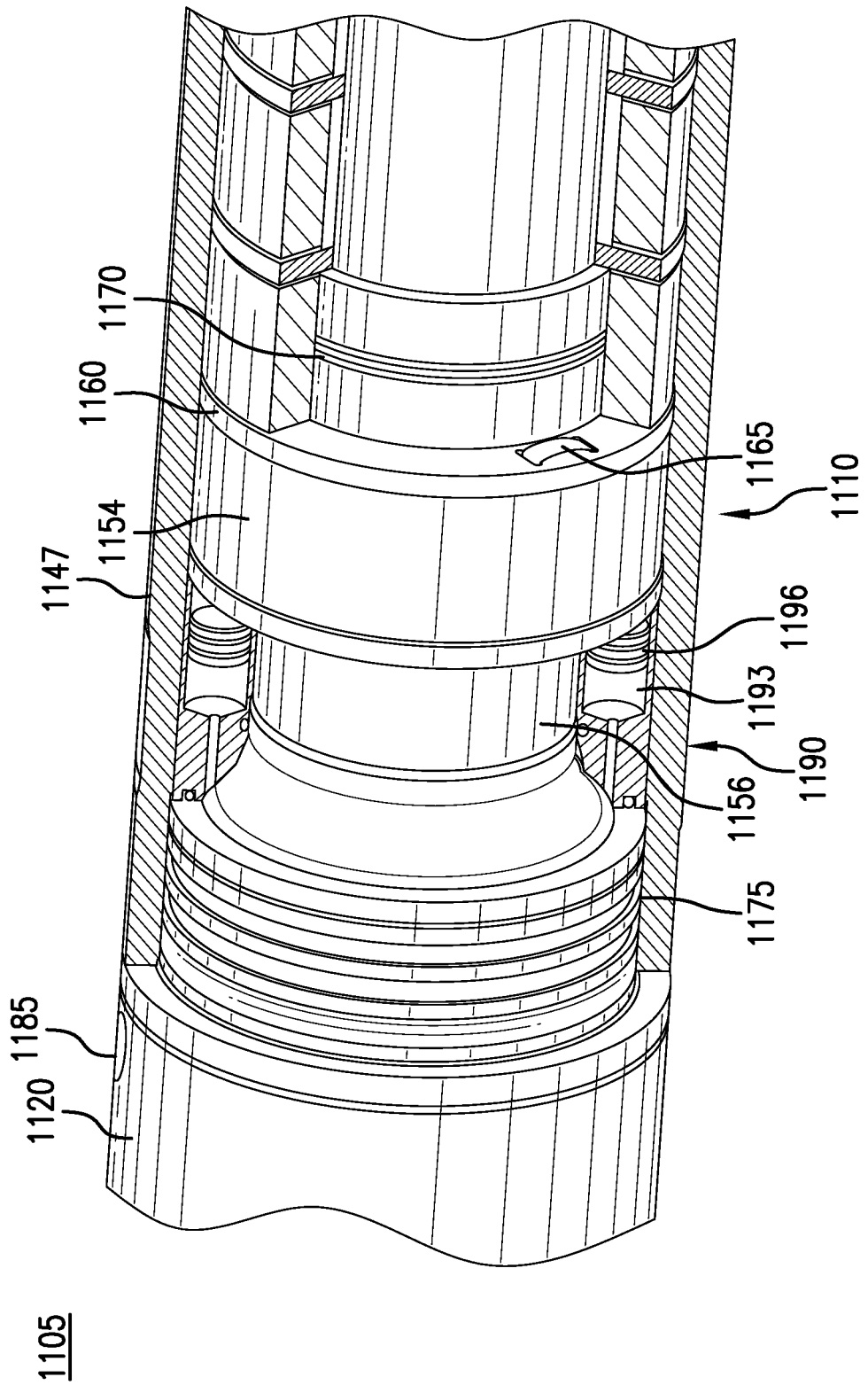
FIG. 10 is a zoom-in view of aspects of FIG. 9 in more detail.

FIGS. 9 and 10 depict an embodiment of damping system that includes a downhole component such as a damping element sub 1100, which can be incorporated into a downhole system such as the system 10. The damping element sub 1100 includes a series of damping elements 1110. FIG. 10 is an expanded view of a portion of the damping element sub 1100 of FIG. 9 corresponding to window 1105.

The damping element sub 1100 comprises a top sub 1120 configured to be connected to a bottom sub 1130 by a connection 1135 (e.g., a threaded connection).

The damping element sub 1100 includes a fluid conduit 1140, such as a central fluid conduit 1140 that may be in fluid communication with borehole fluid 24 and/or with another fluid conduit. For example, the fluid conduit 1140 is configured to be in fluid communication with a drilling fluid or mud conduit, a production fluid conduit, an injection fluid conduit and/or any number of conduits or flow paths that permit fluid communication between a downhole location and a surface location.

The top sub 1120 and/or the bottom sub 1130 are configured to operatively connect to one or more neighboring components, such as the neighboring component 79, a drill pipe, a downhole motor, a BHA 20, or a drill bit 22. Ultimately, the drill bit 22 is operatively connected to a drive, such as a downhole motor or a surface drive/rotary table. The damping element sub 1100 may be in operative connection to the drill bit 22 and the drive, i.e., the top sub 1120 and the bottom sub 1130 may be connected to the drill bit 22 and the drive such that the drive rotates the drill bit 22 by rotating the damping element sub 1100. Optionally, the damping element sub 1100 may include a wire (not shown) or other electrical connection in order to provide data and/or power from below the damping element sub 1100 to above the damping element sub 1100 and/or vice versa, to communicate and/or provide power to other portions of BHA 20.

The damping elements 1110 each comprise at least one ring-shaped inertial mass 1154 that surrounds a portion of the top sub 1120 and the fluid conduit 1140, and is configured to rotate about the top sub 1120 and the fluid conduit 1140. A cover 1147 is installed between the top sub 1120 and the bottom sub 1130, to cover and protect the inertial masses 1154. Side rings 1160 are installed between the inertial masses 1154 and are fixedly connected to the top sub 1120 and/or the cover 1147. In this way, the top sub 1120, the bottom sub 1130, the cover 1147 and the side rings 1160 are rotationally fixed relative to one another, and thus rotate together. The inertial masses 1154 can rotate relative to the top sub 1120, the bottom sub 1130, the cover 1147 and the side rings 1160.

It is noted that each damping element 1110 includes a gap between the inertial mass 1154 and one or more adjacent side rings 1160. The gap may also be defined by a gap or space between the inertial mass 1154 and the cover 1147, and/or other spaces around the inertial mass 1154. In one embodiment, the gap is a portion of an overall cavity that is defined by the cover 1147, the top sub 1120, and the bottom sub 1130 and includes spaces between the inertial masses 1154 and the cover, as well as spaces between the inertial masses and the side rings 1160, as discussed further below.

Optional distance holders 1165 (e.g. elastic distance holders) may be installed between the inertial masses 1154 and side rings 1160 to manage the distance between inertial masses 1154 and side rings 1160 (and thereby manage the gap therebetween) within a preselected range. An optional centralizing device 1170 is included in each of one or more damping elements 1110, and is configured to radially centralize a respective inertial mass 1154 about the top sub 1120 and/or the fluid conduit 1140. For example, the centralizing device 1170 may comprise one or more small bars or noses or spacers about the top sub 1120 that may be configured to keep centralization of a respective inertial mass 1154 within a preselected range.

Rotation of the inertial masses 1154 relative to the top sub 1120 and the side rings 1160 in contact with centralizing devices 1170 and distance holders 1165 will cause friction to occur between inertial masses 1154 and centralizing device 1170 and distance holder 1165. Therefore, each centralizing device 1170 and distance holder 1165 may comprise or may be coated with material that is resistant against abrasion. Alternatively or in addition, each centralizing device 1170 and distance holder 1165 may be elastic (e.g. more elastic than the side rings 1160, the top sub 1120, and/or the inertial masses 1154) to account for variable contact forces and to reduce wear due to friction.

A damping fluid 1156 is included to surround the damping elements 1110 and partially or completely fill the spaces between the inertial masses 1154, the side rings 1160 and the top sub 1120, and is configured to create shear forces when the inertial masses 1154 move relative to the side rings 1160 and the top sub 1120 due to, e.g., vibrations. Such shear forces ultimately lead to a damping effect of said vibrations. In contrast to one or more embodiments shown and discussed with respect to FIGS. 3-5, the inertial masses 1154 of FIGS. 9 and 10 are not sealed against each other by housings surrounding the individual damping elements. Instead, in one embodiment, several inertial masses 1154 are surrounded by the same damping fluid 1156 that fills the complete volume between the top sub 1120, the bottom sub 1130 and the cover 1147. In this way, advantageously, two or more inertial masses 1154 are in fluid communication. Sealing elements may be installed in sealing grooves 1175 between the top sub 1120 and the cover 1147, and similarly between the bottom sub 1130 and the cover 1147, as well as between the top sub 1120 and the bottom sub 1130. Hence, the damping element sub 1100 does not include dynamic sealing elements between parts that move relative to each other due to vibration. Alternatively or in addition, the volume between the top sub 1120, the bottom sub 1130 and the cover 1147 may be pressure compensated, e.g. pressure compensated with respect to the borehole fluid 24, e.g. by one or more bellows (e.g. rubber bellows), between the inside and outside of the volume between the top sub 1120, the bottom sub 1130 and the cover 1147.

The volume between the top sub 1120, the bottom sub 1130 and the cover 1147 may be filled with damping fluid 1156 through an inlet 1185 and an outlet 1186. For example, the volume between the top sub 1120, the bottom sub 1130 and the cover 1147 can be evacuated through one or both of the inlet 1185 and the outlet 1186. After evacuation down to a preselected pressure, damping fluid 1156 can be pumped and/or pressed through the inlet 1185 into the volume between the top sub 1120, the bottom sub 1130 and the cover 1147, until the damping fluid 1156 enters the outlet 1186 or until a pressure difference between the inlet 1185 and the outlet 1186 is within a preselected range.

In one embodiment, a thermal expansion device 1190 is disposed in fluid communication with the volume between top sub 1120, bottom sub 1130 and cover 1147 to account for thermal expansion of damping fluid 1156 or parts within the damping element sub 1100. The thermal expansion device 1190 comprises a relatively small volume 1193 of compressible fluid, such as a fluid that has a higher compressibility than damping fluid 1156, such as gas (e.g. air, a noble gas, nitrogen, or other suitable gas). The volume 1193 is confined by a sealed piston 1196 that moves in response to a pressure difference between the volume 1193 and the volume that is filled with damping fluid 1156.

Set forth below are some embodiments of the foregoing disclosure:

Embodiment 1: An apparatus for damping torsional vibrations in a borehole string, the apparatus comprising: an inertial mass disposed in a cavity in a rotatable downhole component, the rotatable downhole component configured to be disposed in a borehole in a subsurface formation, the inertial mass coupled to the rotatable downhole component by a damping fluid and is free to move relative to the rotatable downhole component; wherein the damping fluid is disposed in the cavity and between the inertial mass and the rotatable downhole component, wherein rotational acceleration of the rotatable downhole component causes shear in the damping fluid to dissipate energy from the rotational acceleration of the rotatable downhole component and causes the rotational acceleration to be reduced.

Embodiment 2: The apparatus as in any prior embodiment, further comprising a housing including the cavity, the housing disposed at the rotatable downhole component and rotationally fixed relative to the rotatable downhole component, wherein the housing is sealed.

Embodiment 3: The apparatus as in any prior embodiment, wherein the apparatus is configured to dampen the torsional vibrations at one or more selected frequencies.

Embodiment 4: The apparatus as in any prior embodiment, wherein the inertial mass is at least one of a ring segment and a ring disposed in the cavity and configured to rotate about a rotational axis of the rotatable downhole component.

Embodiment 5: The apparatus as in any prior embodiment, further comprising at least one bearing device configured to be disposed between the inertial mass and the rotatable downhole component, the bearing device configured to support movement of the inertial mass relative to the rotatable downhole component.

Embodiment 6: The apparatus as in any prior embodiment, further comprising a thermally conductive material, the thermally conductive material having a heat conductivity greater than at least one of a heat conductivity of the inertial mass, a heat conductivity of the damping fluid, a heat conductivity of the housing, and a heat conductivity of the rotatable downhole component, and configured to transfer the dissipated energy away from at least one of the inertial mass, the damping fluid, the housing, and the rotatable downhole component.

Embodiment 7: The apparatus as in any prior embodiment, wherein the apparatus has one or more properties configured to dampen the torsional vibrations at a selected vibrational frequency, the one or more properties including at least one of a selected density of the inertial mass, a selected weight of the inertial mass, a selected roughness of an outer surface of the inertial mass, a selected roughness of an inner surface of the cavity, a selected gap between the inertial mass and the inner surface, a selected viscosity of the damping fluid, a selected density of the damping fluid, a selected compressibility of the damping fluid.

Embodiment 8: The apparatus as in any prior embodiment, wherein the inertial mass includes a first constituent component having a first density and a second constituent component having a second density, the second density greater than the first density.

Embodiment 9: The apparatus as in any prior embodiment, wherein the housing includes a fluid port that allows the cavity to be at least partially filled with the damping fluid.

Embodiment 10: The apparatus as in any prior embodiment, wherein the apparatus is configured to reduce a gap between an inner surface of the cavity and the inertial mass in response to increasing temperature.

Embodiment 11: The apparatus as in any prior embodiment, further comprising a plurality of inertial masses coupled to the rotatable downhole component by the damping fluid and free to move relative to the rotatable downhole component; wherein the rotational acceleration of the rotatable downhole component causes shear in the damping fluid to dissipate energy from the rotational acceleration.

Embodiment 12: The apparatus as in any prior embodiment, wherein the plurality of inertial masses includes a first inertial mass configured to mainly dampen the torsional vibrations at a first frequency, and a second inertial mass configured to mainly dampen the torsional vibrations at a second frequency, the first frequency different than the second frequency.

Embodiment 13: The apparatus as in any prior embodiment, further comprising at least one of a porous material, an elastic material, and a tortuous material between the inertial mass and the cavity.

Embodiment 14: A method of damping torsional vibrations in a borehole string, the method comprising: disposing a rotatable downhole component and a damping assembly in a borehole in a subsurface formation, the damping assembly including a cavity that is rotationally fixed relative to the rotatable downhole component, and an inertial mass disposed in the cavity and coupled to the rotatable downhole component by a damping fluid disposed between the inertial mass and the rotatable downhole component, wherein the inertial mass is free to move relative to the rotatable downhole component; performing an operation that includes rotating the rotatable downhole component and causes the torsional vibrations of the rotatable downhole component; and damping at least partially the torsional vibrations of the rotatable downhole component, wherein the damping includes causing rotational acceleration to be reduced based on shear occurring in the damping fluid due to relative movement between the inertial mass and the rotatable downhole component.

Embodiment 15: The method as in any prior embodiment, wherein the damping assembly includes a housing including the cavity, the housing rotationally fixed relative to the rotatable downhole component, wherein the housing is sealed.

Embodiment 16: The method as in any prior embodiment, wherein the inertial mass is at least one of a ring segment and a ring disposed in the cavity and configured to rotate about a rotational axis of the rotatable downhole component.

Embodiment 17: The method as in any prior embodiment, wherein the damping assembly includes at least one bearing device configured to be disposed between the inertial mass and the rotatable downhole component, the bearing device configured to support the relative movement of the inertial mass relative to the rotatable downhole component.

Embodiment 18: The method as in any prior embodiment, further comprising transferring dissipated energy away from the damping assembly by a thermally conductive material having a heat conductivity greater than at least one of a heat conductivity of the inertial mass, a heat conductivity of the damping fluid, a heat conductivity of the housing, a heat conductivity of the rotatable downhole component.

Embodiment 19: The method as in any prior embodiment, further comprising selecting a vibration frequency and selecting one or more properties configured to dampen the torsional vibrations at the selected vibration frequency, wherein the one or more properties including at least one of a density of the inertial mass, weight of the inertial mass, a roughness of an outer surface of the inertial mass, a roughness of an inner surface of the cavity, a gap between the inertial mass and the inner surface, a viscosity of the damping fluid, a density of the damping fluid, and a compressibility of the damping fluid.

Embodiment 20: The method as in any prior embodiment, wherein the damping assembly includes a first inertial mass configured to mainly dampen the torsional vibrations at a first frequency, and a second inertial mass configured to mainly dampen the torsional vibrations at a second frequency, the first frequency different than the second frequency.

Embodiment 21: The apparatus as in any prior embodiment, wherein the damping fluid is configured to at least one of: over-proportionally dissipate the energy at high rotational accelerations above a selected acceleration, under-proportionally dissipate the energy at the high rotational accelerations, and proportionally dissipate the energy at the high rotational accelerations and/or at accelerations lower than the high rotational accelerations.

In connection with the teachings herein, various analyses and/or analytical components may be used, including digital and/or analog subsystems. The system may have components such as a processor, storage media, memory, input, output, communications link (wired, wireless, pulsed mud, optical or other), user interfaces, software programs, signal processors and other such components (such as resistors, capacitors, inductors, etc.) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user, or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

What is claimed is:

1. An apparatus for damping torsional vibrations in a borehole string, the apparatus comprising:
   a plurality of inertial masses disposed in a cavity in a rotatable downhole component, the rotatable downhole component configured to be disposed in a borehole in a subsurface formation, wherein each inertial mass of the plurality of inertial masses includes a ring or a ring segment, the plurality of inertial masses are coupled to the rotatable downhole component by a damping fluid, and the plurality of inertial masses are free to move relative to the rotatable downhole component such that a full rotation of each inertial mass of the plurality of inertial masses relative to the rotatable downhole component is permitted, wherein the plurality of inertial masses are arrayed along a rotational axis of the rotatable downhole component and are configured to rotate about the rotational axis of the rotatable downhole component; wherein
   the damping fluid is disposed in the cavity and between the plurality of inertial masses and the rotatable downhole component, wherein rotational acceleration of the rotatable downhole component causes shear in the damping fluid to dissipate energy from the rotational acceleration of the rotatable downhole component and causes the rotational acceleration of the rotatable downhole component to be reduced.

2. The apparatus of claim 1, further comprising a housing including the cavity, the housing disposed at the rotatable downhole component and rotationally fixed relative to the rotatable downhole component, wherein the housing is sealed.

3. The apparatus of claim 2, further comprising a thermally conductive material, the thermally conductive material having a heat conductivity greater than at least one of a heat conductivity of the plurality of inertial masses, a heat conductivity of the damping fluid, a heat conductivity of the housing, and a heat conductivity of the rotatable downhole component, and the thermally conductive material configured to transfer the dissipated energy away from at least one of the plurality of inertial masses, the damping fluid, the housing, and the rotatable downhole component.

4. The apparatus of claim 1, wherein the apparatus is configured to dampen the torsional vibrations at one or more selected frequencies.

5. The apparatus of claim 4, wherein the one or more selected frequencies are dampened without a rigid spring element.

6. The apparatus of claim 1, further comprising at least one bearing device configured to be disposed between at least one inertial mass of the plurality of inertial masses and the rotatable downhole component, the at least one bearing device configured to support movement of the at least one inertial mass relative to the rotatable downhole component.

7. The apparatus of claim 1, wherein the apparatus has one or more properties configured to dampen the torsional vibrations at a selected vibrational frequency, the one or more properties including at least one of a selected density of at least one of the plurality of inertial masses, a selected weight of the at least one of the plurality of inertial masses, a selected roughness of an outer surface of the at least one of the plurality of inertial masses, a selected roughness of an inner surface of the cavity, a selected gap between the at least one of the plurality of inertial masses and the inner surface, a selected viscosity of the damping fluid, a selected density of the damping fluid, a selected compressibility of the damping fluid.

8. The apparatus of claim 1, wherein at least one inertial mass of the plurality of inertial masses includes a first constituent component having a first density and a second constituent component having a second density, the second density greater than the first density.

9. The apparatus of claim 1, wherein each inertial mass of the plurality of inertial masses is free to rotate relative to the cavity and is not restricted in a rotational direction by the rotatable downhole component, and the rotational acceleration of the rotatable downhole component is caused to reduce based only on viscous friction applied by the damping fluid.

10. The apparatus of claim 1, wherein the apparatus is configured to reduce a gap between an inner surface of the cavity and at least one of the plurality of inertial masses in response to increasing temperature.

11. The apparatus of claim 1, wherein the damping fluid is present between two or more of the plurality of inertial masses or between at least one of the plurality of inertial masses and a surface of the cavity.

12. The apparatus of claim 1, wherein the plurality of inertial masses includes a first inertial mass configured to mainly dampen the torsional vibrations at a first frequency, and a second inertial mass configured to mainly dampen the torsional vibrations at a second frequency, the first frequency different than the second frequency.

13. The apparatus of claim 1, further comprising at least one of a porous material, an elastic material, and a tortuous material between the plurality of inertial masses and the cavity.

14. The apparatus of claim 1, wherein the damping fluid is configured to at least one of: over-proportionally dissipate the energy at high rotational accelerations of the rotatable downhole component above a selected acceleration, under-proportionally dissipate the energy at the high rotational accelerations of the rotatable downhole component, and proportionally dissipate the energy at the high rotational accelerations of the rotatable downhole component and/or at accelerations of the rotatable downhole component lower than the high rotational accelerations of the rotatable downhole component.

15. The apparatus of claim 1, further comprising one or more side rings between two or more of the plurality of inertial masses and fixedly connected to the rotatable downhole component.

16. The apparatus of claim 1, wherein the damping fluid has a viscosity between 10,000 and 1000,000 centistokes at room temperature and/or wherein a gap between at least one of the plurality of inertial masses and an inner surface of the cavity is in the range of 0.01 to 5 mm.

17. A method of damping torsional vibrations in a borehole string, the method comprising:
disposing a rotatable downhole component and a damping assembly in a borehole in a subsurface formation, the damping assembly including a cavity that is rotationally fixed relative to the rotatable downhole component, and a plurality of inertial masses disposed in the cavity and coupled to the rotatable downhole component by a damping fluid disposed between at least one of the plurality of inertial masses and the rotatable downhole component, wherein each inertial mass of the plurality of inertial masses includes a ring or a ring segment, and the plurality of inertial masses are free to move relative to the rotatable downhole component such that a full rotation of each of the plurality of inertial masses relative to the rotatable downhole component is permitted, wherein the plurality of inertial masses are arrayed along a rotational axis of the rotatable downhole component and are configured to rotate about the rotational axis of the rotatable downhole component;
performing an operation that includes rotating the rotatable downhole component and causing the torsional vibrations of the rotatable downhole component; and
damping at least partially the torsional vibrations of the rotatable downhole component, wherein the damping includes causing rotational acceleration of the rotatable downhole component to be reduced based on shear occurring in the damping fluid due to relative movement between the plurality of inertial masses and the rotatable downhole component.

18. The method of claim 17, wherein the damping assembly includes a housing including the cavity, the housing rotationally fixed relative to the rotatable downhole component, wherein the housing is sealed.

19. The method of claim 18, further comprising transferring dissipated energy away from the damping assembly by a thermally conductive material having a heat conductivity greater than at least one of a heat conductivity of the plurality of inertial masses, a heat conductivity of the damping fluid, a heat conductivity of the housing, and a heat conductivity of the rotatable downhole component.

20. The method of claim 17, wherein the damping assembly includes a bearing device configured to be disposed between the at least one of the plurality of inertial masses and the rotatable downhole component, the bearing device configured to support the relative movement between the plurality of inertial masses and the rotatable downhole component.

21. The method of claim 17, further comprising selecting a vibration frequency and selecting one or more properties configured to dampen the torsional vibrations at the selected vibration frequency, wherein the one or more properties including at least one of a density of the at least one of the plurality of inertial masses, a weight of the at least one of the plurality of inertial masses, a roughness of an outer surface of the at least one of the plurality of inertial masses, a roughness of an inner surface of the cavity, a gap between the at least one of the plurality of inertial masses and the inner surface, a viscosity of the damping fluid, a density of the damping fluid, and a compressibility of the damping fluid.

22. The method of claim 17, wherein the damping assembly includes a first inertial mass configured to mainly dampen the torsional vibrations at a first frequency, and a second inertial mass configured to mainly dampen the torsional vibrations at a second frequency, the first frequency different than the second frequency.

23. The method of claim 17, wherein the damping is based on viscous friction without elastic deformation of an associated spring element.

* * * * *